United States Patent
Omote et al.

(10) Patent No.: US 8,121,755 B2
(45) Date of Patent: Feb. 21, 2012

(54) SOUND-DIRECTED-OUTSIDE-VEHICLE EMITTING DEVICE

(75) Inventors: Asako Omote, Tokyo (JP); Takahisa Aoyagi, Tokyo (JP); Takuya Taniguchi, Tokyo (JP); Noritaka Kokido, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/130,623

(22) PCT Filed: May 26, 2010

(86) PCT No.: PCT/JP2010/003528
§ 371 (c)(1),
(2), (4) Date: May 23, 2011

(87) PCT Pub. No.: WO2011/148417
PCT Pub. Date: Dec. 1, 2011

(65) Prior Publication Data
US 2011/0313617 A1   Dec. 22, 2011

(51) Int. Cl.
*B60Q 5/00* (2006.01)
*G06F 19/00* (2006.01)
(52) U.S. Cl. ............. 701/36; 701/45; 701/207; 340/463
(58) Field of Classification Search .................... None
See application file for complete search history.

(56) References Cited

U.S. PATENT DOCUMENTS

| | | | | |
|---|---|---|---|---|
| 8,031,085 B1 * | 10/2011 | Anderson | ...................... | 340/988 |
| 2005/0200462 A1 * | 9/2005 | Maekawa et al. | ............. | 340/435 |
| 2005/0232432 A1 * | 10/2005 | Yasushi et al. | ................... | 381/17 |
| 2009/0066499 A1 * | 3/2009 | Bai et al. | ........................ | 340/459 |
| 2010/0228434 A1 * | 9/2010 | Leyerle | ............................. | 701/36 |
| 2011/0044470 A1 * | 2/2011 | Ogata | ............................. | 381/86 |
| 2011/0128161 A1 * | 6/2011 | Bae et al. | ....................... | 340/901 |

FOREIGN PATENT DOCUMENTS

| | | | |
|---|---|---|---|
| JP | 11-27810 | * | 1/1999 |
| JP | 2002-213970 | * | 7/2002 |
| JP | 2004-136831 A | | 5/2004 |
| JP | 2004-153929 | * | 5/2004 |
| JP | 2005-219715 A | | 8/2005 |
| JP | 2005-219716 A | | 8/2005 |
| JP | 2005-253236 | * | 9/2005 |
| JP | 2005-278281 | * | 10/2005 |
| JP | 2005-343360 | * | 12/2005 |
| JP | 2006-264525 A | | 10/2006 |
| JP | 2008-162429 | * | 7/2008 |
| JP | 3147168 U | | 12/2008 |
| JP | 3149916 U | | 4/2009 |
| JP | 2009-98956 | * | 5/2009 |
| WO | WO 00/12354 | * | 3/2000 |

* cited by examiner

*Primary Examiner* — Michael J. Zanelli
(74) *Attorney, Agent, or Firm* — Birch, Stewart, Kolasch & Birch, LLP

(57) ABSTRACT

A sound-directed-outside-vehicle emitting device includes a storage unit 2-A for storing criteria by each of which to determine whether or not a running zone is a high-risk zone, each of the criteria describing a status of the vehicle, and a navigation device 1-A for acquiring information showing a status of the vehicle. The sound-directed-outside-vehicle emitting device compares the information acquired by the navigation device 1-A with the criteria stored in the storage unit 2-A to determine whether the above-mentioned vehicle is running through a high-risk zone, and does not stop the output of a warning sound when determining that the vehicle is running through a high-risk zone even if a switch 4 for commanding a stop of the output of the warning sound is operated.

12 Claims, 20 Drawing Sheets

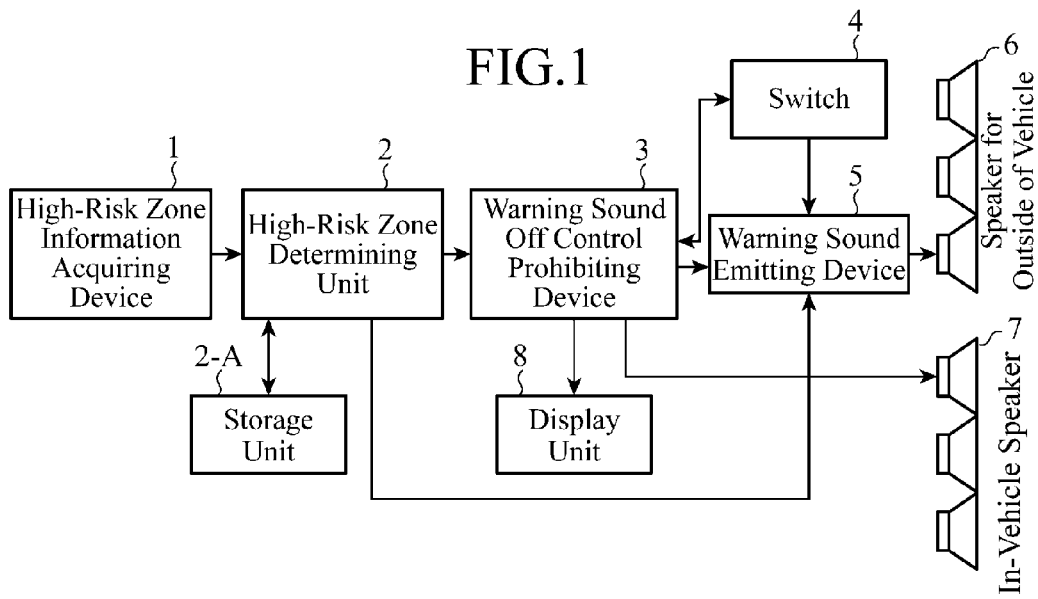

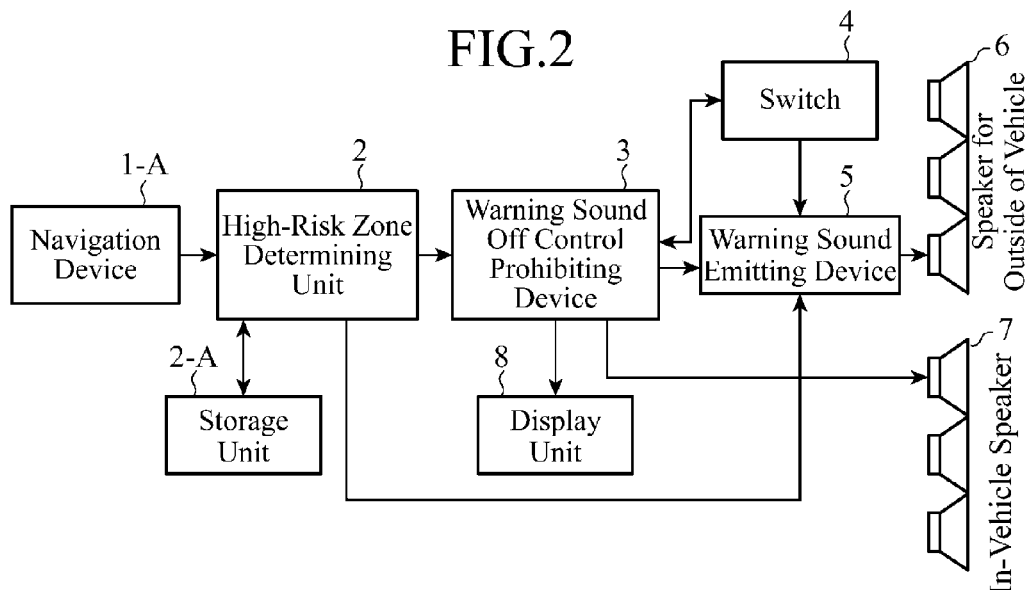

FIG.3

| Number | Criterion Contents | Determination |
|---|---|---|
| Criterion 1 | Is the Running Zone an Accident Danger Zone? | × |
| Criterion 2 | Is There Any Elementary School in the Surrounding Area of the Vehicle? | × |
| Criterion 3 | Is the Vehicle Running through an Intersection? | O |
| Criterion 4 | Will the Vehicle Make a Right or Left Turn? | × |
| Criterion 5 | Is the Speed Limit 20km or Less? | × |
| ⋮ | ⋮ | ⋮ |
| Determination Result | | High-Risk Zone |

FIG.4

| Number | Criterion Contents | Additional Criterion | Determination |
|---|---|---|---|
| Criterion 1 | Is the Running Zone an Accident Danger Zone? | – | × |
| Criterion 2 | Is There Any Elementary School in the Surrounding Area of the Vehicle? | During School Commute Times | ○ |
| Criterion 3 | Is There Any Shopping Center in the Surrounding Area of the Vehicle? | During Business Hours | × |
| Criterion 4 | Is the Vehicle Running through an Intersection? | – | × |
| Criterion 5 | Will the Vehicle Make a Right or Left Turn? | – | × |
| ⋮ | ⋮ | | ⋮ |
| Determination Result | | | High-Risk Zone |

FIG.5

| Number | Criterion Contents | Degree of Risk | Determination |
|---|---|---|---|
| Criterion 1 | Is the Running Zone an Accident Danger Zone? | 9 | × |
| Criterion 2 | Is There Any Elementary School in the Surrounding Area of the Vehicle? | 5 | × |
| Criterion 3 | Is the Vehicle Running through an Intersection? | 4 | ○ |
| Criterion 4 | Will the Vehicle Make a Right or Left Turn? | 5 | ○ |
| Criterion 5 | Is the Speed Limit 20km or Less? | 3 | × |
| ⋮ | ⋮ | ⋮ | ⋮ |
| Determination Result (8 or More: High-Risk Zone Less Than 8: Safe Zone) | | Sum Total:9 | High-Risk Zone |

FIG.6

| Number | Criterion Contents | Additional Criterion | Degree of Risk | Determination |
|---|---|---|---|---|
| Criterion 1 | Is the Running Zone an Accident Danger Zone? | – | 9 | × |
| Criterion 2 | Is There Any Elementary School in the Surrounding Area of the Vehicle? | During School Commute Times | 10 | ○ |
| | | Except During School Commute Times | 3 | × |
| Criterion 3 | Is There Any Shopping Center in the Surrounding Area of the Vehicle? | During Business Hours | 9 | × |
| | | Except During Business Hours | 2 | × |
| Criterion 4 | Is the Vehicle Running through an Intersection? | – | 5 | ○ |
| Criterion 5 | Will the Vehicle Make a Right or Left Turn? | – | 3 | × |
| ⋮ | ⋮ | ⋮ | ⋮ | ⋮ |
| Determination Result (8 or More: High-Risk Zone Less Than 8: Safe Zone) | | | Sum Total :15 | High-Risk Zone |

FIG.15

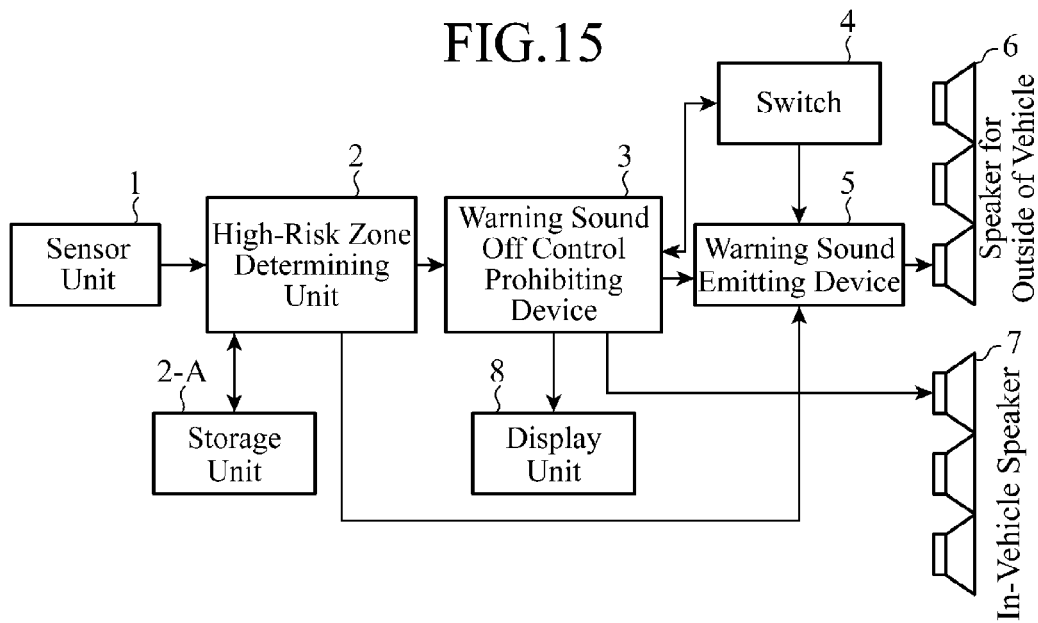

FIG.16

| Number | Criterion Contents | Determination |
|---|---|---|
| Criterion 1 | Is There Any Pedestrian in the Surrounding Area of the Vehicle? | ○ |
| Criterion 2 | Is There Any Light Vehicle or Any Motorbike in the Surrounding Area of the Vehicle? | × |
| Criterion 3 | Is There Any Other Vehicle in the Surrounding Area of the Vehicle? | × |
| ⋮ | ⋮ | ⋮ |
| Determination Result | | High-Risk Zone |

FIG.17

| Number | Criterion Contents | Degree of Risk | Determination |
|---|---|---|---|
| Criterion 1 | Is There Any Pedestrian in the Surrounding Area of the Vehicle? | 8 | ○ |
| Criterion 2 | Is There Any Light Vehicle or Any Motorbike in the Surrounding Area of the Vehicle? | 6 | × |
| Criterion 3 | Is There Any Other Vehicle in the Surrounding Area of the Vehicle? | 5 | × |
| ⋮ | ⋮ | ⋮ | ⋮ |
| Determination Result (8 or More: High-Risk Zone Less Than 8: Safe Zone) | | Sum Total:8 | High-Risk Zone |

FIG.18

| Number | Criterion Contents | Additional Criterion | Degree of Risk | Determination |
|---|---|---|---|---|
| Criterion 1 | Is There Any Pedestrian in the Surrounding Area of the Vehicle? | Area Having a Radius of Less Than 3m | 9 | O |
| | | Area Having a Radius from 3m to 5m | 5 | × |
| Criterion 2 | Is There Any Light Vehicle or Any Motorbike in the Surrounding Area of the Vehicle? | Area Having a Radius of Less Than 5m | 8 | × |
| | | Area Having a Radius from 5m to 7m | 4 | O |
| Criterion 3 | Is There Any Other Vehicle in the Surrounding Area of the Vehicle? | Area Having a Radius of Less Than 5m | 8 | × |
| | | Area Having a Radius from 5m to 10m | 3 | × |
| ⋮ | ⋮ | ⋮ | ⋮ | ⋮ |
| Determination Result (8 or More: High-Risk Zone Less Than 8: Safe Zone) | | | Sum Total :13 | High-Risk Zone |

FIG.19

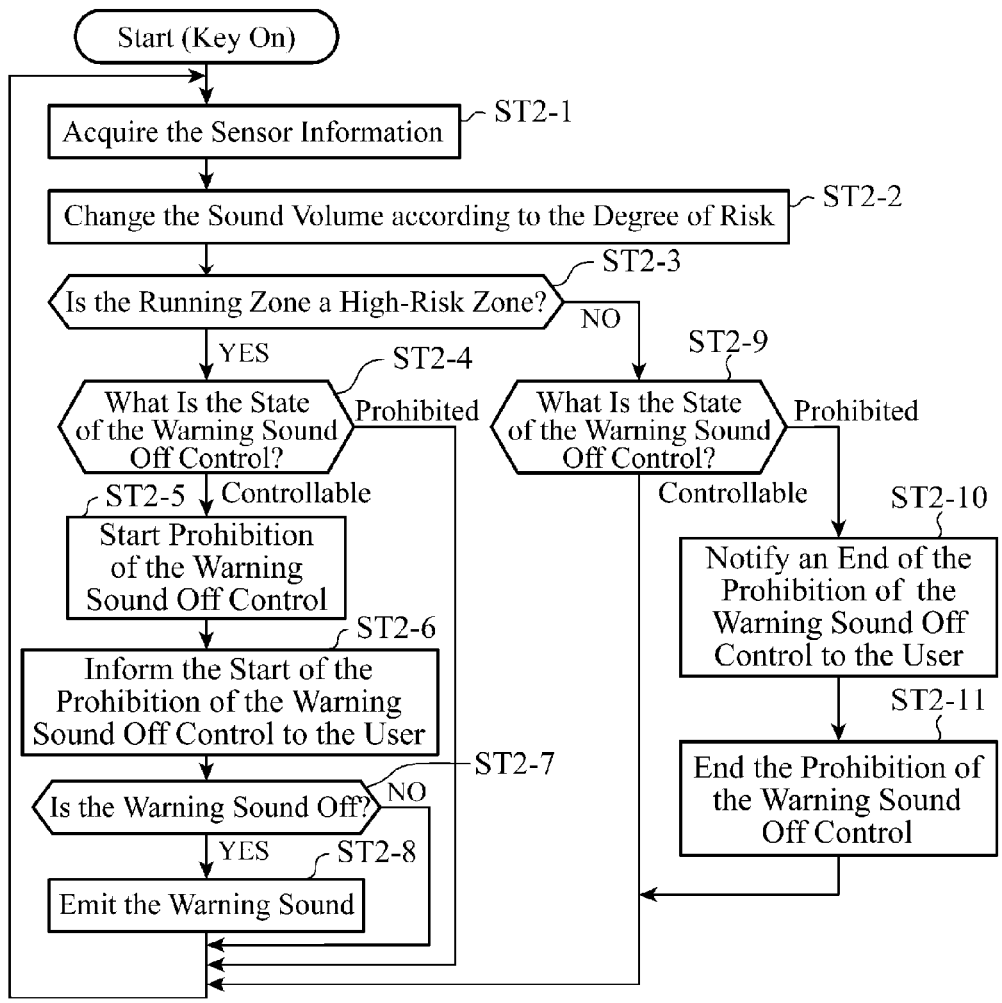

FIG. 20

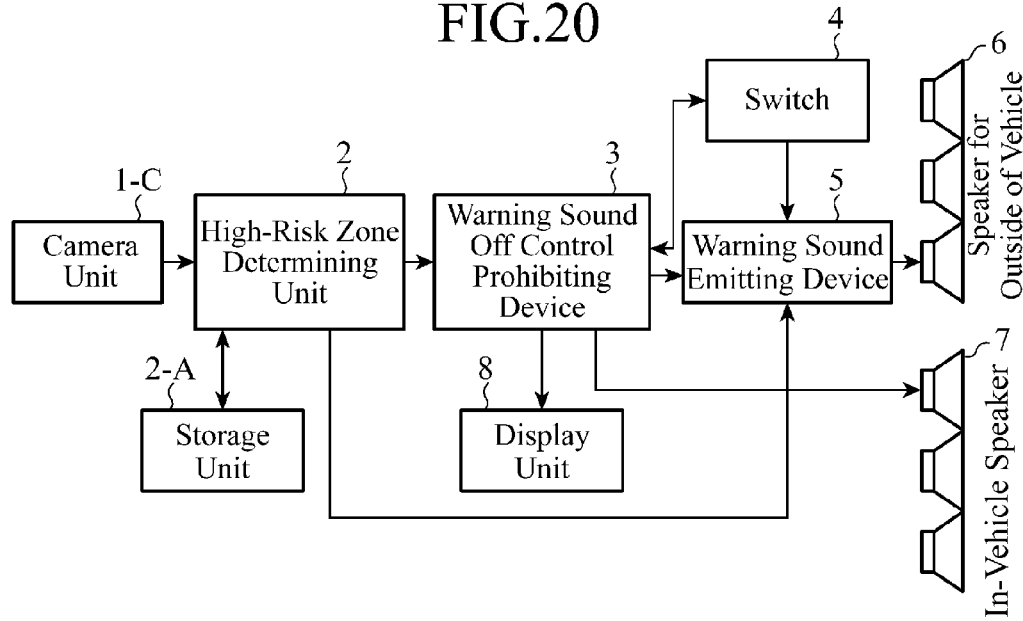

FIG. 21

| Number | Criterion Contents | Determination |
|---|---|---|
| Criterion 1 | Is There Any Obstacle in the Surrounding Area of the Vehicle? | O |
| Criterion 2 | Is the Vehicle Running through a School Zone? | × |
| Criterion 3 | Is the Road Width Narrow? | × |
| Criterion 4 | Is the Vehicle Running through an Intersection? | × |
| ⋮ | ⋮ | ⋮ |
| Determination Result | | High-Risk Zone |

FIG. 22

| Number | Criterion Contents | Degree of Risk | Determination |
|---|---|---|---|
| Criterion 1 | Is There Any Obstacle in the Surrounding Area of the Vehicle? | 8 | × |
| Criterion 2 | Is the Vehicle Running through a School Zone? | 8 | × |
| Criterion 3 | Is the Road Width Narrow? | 5 | O |
| Criterion 4 | Is the Vehicle Running through an Intersection? | 4 | O |
| ⋮ | ⋮ | ⋮ | ⋮ |
| Determination Result (8 or More: High-Risk Zone Less Than 8: Safe Zone) | | Sum Total: 9 | High-Risk Zone |

FIG.23

| Number | Criterion Contents | Additional Criterion | Degree of Risk | Determination |
|---|---|---|---|---|
| Criterion 1 | Is There Any Obstacle in the Surrounding Area of the Vehicle? | Area Having a Radius of Less Than 3m | 9 | × |
| | | Area Having a Radius from 3m to 5m | 5 | ○ |
| Criterion 2 | Is the Vehicle Running through a School Zone? | – | 10 | × |
| Criterion 3 | Is the Road Width Narrow? | Less Than 5m | 6 | × |
| | | 5m to 10m | 3 | ○ |
| Criterion 4 | Is the Vehicle Running through an Intersection? | – | 4 | × |
| ⋮ | ⋮ | ⋮ | ⋮ | ⋮ |
| Determination Result (8 or More: High-Risk Zone Less Than 8: Safe Zone) | | | Sum Total :8 | High-Risk Zone |

FIG.25

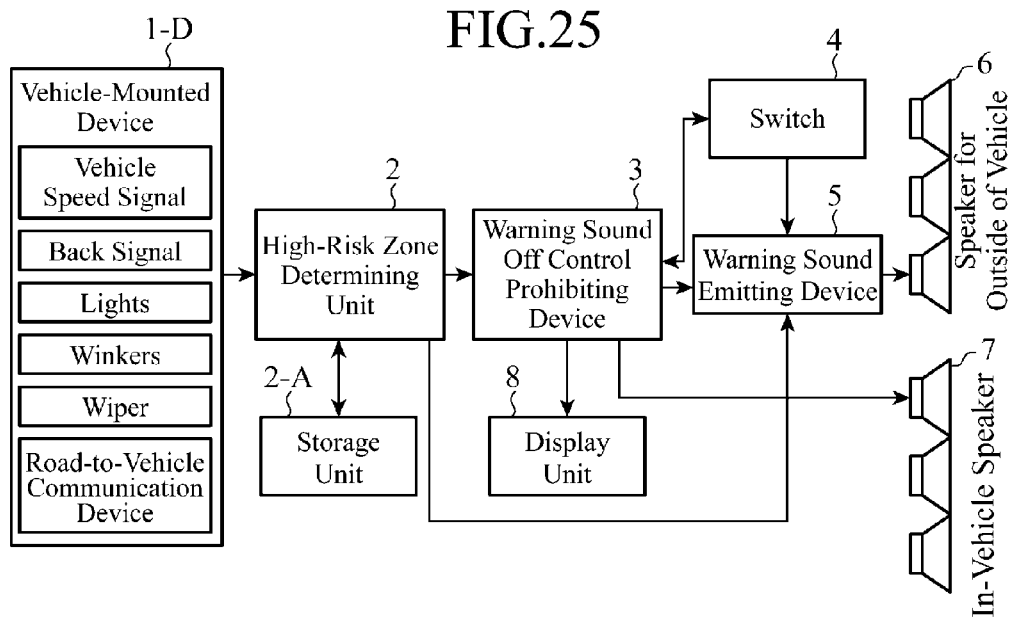

FIG.26

| Number | Criterion Contents | Determination |
|---|---|---|
| Criterion 1 | Is the Vehicle Running at a Low Speed (Equal to or Lower Than an Arbitrary Threshold)? | ○ |
| Criterion 2 | Do the Lights Stay Lit? | × |
| Criterion 3 | Is a Winker Operating? | × |
| Criterion 4 | Is the Wiper Operating? | × |
| ⋮ | ⋮ | ⋮ |
| Determination Result | | High-Risk Zone |

FIG.27

| Number | Criterion Contents | Degree of Risk | Determination |
|---|---|---|---|
| Criterion 1 | Is the Vehicle Running at a Low Speed (Equal to or Lower Than an Arbitrary Threshold)? | 8 | × |
| Criterion 2 | Do the Lights Stay Lit? | 4 | ○ |
| Criterion 3 | Is a Winker Operating? | 4 | ○ |
| Criterion 4 | Is the Wiper Operating? | 4 | × |
| ⋮ | ⋮ | ⋮ | ⋮ |
| Determination Result (8 or More: High-Risk Zone Less Than 8: Safe Zone) | | Sum Total:8 | High-Risk Zone |

FIG.28

| Number | Criterion Contents | Additional Criterion | Degree of Risk | Determination |
|---|---|---|---|---|
| Criterion 1 | Is the Vehicle Running at a Low Speed (Equal to or Lower Than an Arbitrary Threshold)? | Speed Less Than 20km/h | 9 | × |
| | | Speed from 20 to 30 km/h | 4 | ○ |
| Criterion 2 | Do the Lights Stay Lit? | – | 4 | × |
| Criterion 3 | Is a Winker Operating? | – | 4 | × |
| Criterion 4 | Is the Wiper Operating? | – | 4 | ○ |
| ⋮ | ⋮ | ⋮ | ⋮ | ⋮ |
| Determination Result (8 or More: High-Risk Zone Less Than 8: Safe Zone) | | | Sum Total :8 | High-Risk Zone |

FIG.31

| Number | Criterion Contents | Determination |
|---|---|---|
| Criterion 01 | Is the Running Zone an Accident Danger Zone? (Acquired By Car Navigation) | × |
| Criterion 02 | Is There Any Elementary School in the Surrounding Area of the Vehicle? (Acquired By Car Navigation) | × |
| Criterion 03 | Is the Vehicle Running through an Intersection? (Acquired By Car Navigation) | × |
| Criterion 04 | Will the Vehicle Make a Right or Left Turn? (Acquired By Car Navigation) | × |
| Criterion 05 | Is the Speed Limit 20km or Less? (Acquired By Car Navigation) | × |
| ⋮ | ⋮ | ⋮ |
| Criterion 11 | Is There Any Pedestrian in the Surrounding Area of the Vehicle? (Acquired By Sensor) | ○ |
| Criterion 12 | Is There Any Light Vehicle or Any Motorbike in the Surrounding Area of the Vehicle? (Acquired By Sensor) | × |
| Criterion 13 | Is There Any Other Vehicle in the Surrounding Area of the Vehicle? (Acquired By Sensor) | × |
| ⋮ | ⋮ | ⋮ |
| Criterion 21 | Is There Any Obstacle in the Surrounding Area of the Vehicle? (Acquired By Camera) | ○ |
| Criterion 22 | Is the Vehicle Running through a School Zone? (Acquired By Camera) | × |
| Criterion 23 | Is the Road Width Narrow? (Acquired By Camera) | × |
| Criterion 24 | Is the Vehicle Running through an Intersection? (Acquired By Camera) | × |
| ⋮ | ⋮ | ⋮ |
| Criterion 31 | Is the Vehicle Running at a Low Speed (Equal to or Lower Than an Arbitrary Threshold)? (Acquired By Vehicle-Mounted Device) | × |
| Criterion 32 | Do the Lights Stay Lit? (Acquired By Vehicle-Mounted Device) | × |
| Criterion 33 | Is a Winker Operating? (Acquired By Vehicle-Mounted Device) | × |
| Criterion 34 | Is the Wiper Operating? (Acquired By Vehicle-Mounted Device) | × |
| ⋮ | ⋮ | ⋮ |
| | Determination Result | High-Risk Zone |

FIG.32

| Number | Criterion Contents | Additional Criterion | Determination |
|---|---|---|---|
| Criterion 01 | Is the Running Zone an Accident Danger Zone? (Acquired By Car Navigation) | – | × |
| Criterion 02 | Is There Any Elementary School in the Surrounding Area of the Vehicle? (Acquired By Car Navigation) | During School Commute Times | ○ |
| Criterion 03 | Is the Vehicle Running through an Intersection? (Acquired By Car Navigation) | During Business Hours | × |
| Criterion 04 | Will the Vehicle Make a Right or Left Turn? (Acquired By Car Navigation) | – | × |
| Criterion 05 | Is the Speed Limit 20km or Less? (Acquired By Car Navigation) | – | × |
| ⋮ | ⋮ | ⋮ | ⋮ |
| Criterion 11 | Is There Any Pedestrian in the Surrounding Area of the Vehicle? (Acquired By Sensor) | – | × |
| Criterion 12 | Is There Any Light Vehicle or Any Motorbike in the Surrounding Area of the Vehicle? (Acquired By Sensor) | – | × |
| Criterion 13 | Is There Any Other Vehicle in the Surrounding Area of the Vehicle? (Acquired By Sensor) | – | × |
| ⋮ | ⋮ | ⋮ | ⋮ |
| Criterion 21 | Is There Any Obstacle in the Surrounding Area of the Vehicle? (Acquired By Camera) | – | |
| Criterion 22 | Is the Vehicle Running through a School Zone? (Acquired By Camera) | During School Commute Times | ○ |
| Criterion 23 | Is the Road Width Narrow? (Acquired By Camera) | – | × |
| Criterion 24 | Is the Vehicle Running through an Intersection? (Acquired By Camera) | – | × |
| ⋮ | ⋮ | ⋮ | ⋮ |
| Criterion 31 | Is the Vehicle Running at a Low Speed (Equal to or Lower Than an Arbitrary Threshold)? (Acquired By Vehicle-Mounted Device) | – | × |
| Criterion 32 | Do the Lights Stay Lit? (Acquired By Vehicle-Mounted Device) | – | × |
| Criterion 33 | Is a Winker Operating? (Acquired By Vehicle-Mounted Device) | – | × |
| Criterion 34 | Is the Wiper Operating? (Acquired By Vehicle-Mounted Device) | – | × |
| ⋮ | ⋮ | ⋮ | ⋮ |
| Determination Result | | | High-Risk Zone |

FIG.33

| Number | Criterion Contents | Degree of Risk | Determination |
|---|---|---|---|
| Criterion 01 | Is the Running Zone an Accident Danger Zone? (Acquired By Car Navigation) | 9 | × |
| Criterion 02 | Is There Any Elementary School in the Surrounding Area of the Vehicle? (Acquired By Car Navigation) | 5 | × |
| Criterion 03 | Is the Vehicle Running through an Intersection? (Acquired By Car Navigation) | 4 | × |
| Criterion 04 | Will the Vehicle Make a Right or Left Turn? (Acquired By Car Navigation) | 5 | × |
| Criterion 05 | Is the Speed Limit 20km or Less? (Acquired By Car Navigation) | 3 | ○ |
| ⋮ | ⋮ | ⋮ | ⋮ |
| Criterion 11 | Is There Any Pedestrian in the Surrounding Area of the Vehicle? (Acquired By Sensor) | 8 | × |
| Criterion 12 | Is There Any Light Vehicle or Any Motorbike in the Surrounding Area of the Vehicle? (Acquired By Sensor) | 6 | × |
| Criterion 13 | Is There Any Other Vehicle in the Surrounding Area of the Vehicle? (Acquired By Sensor) | 5 | × |
| ⋮ | ⋮ | ⋮ | ⋮ |
| Criterion 21 | Is There Any Obstacle in the Surrounding Area of the Vehicle? (Acquired By Camera) | 8 | × |
| Criterion 22 | Is the Vehicle Running through a School Zone? (Acquired By Camera) | 8 | × |
| Criterion 23 | Is the Road Width Narrow? (Acquired By Camera) | 5 | × |
| Criterion 24 | Is the Vehicle Running through an Intersection? (Acquired By Camera) | 4 | × |
| ⋮ | ⋮ | ⋮ | ⋮ |
| Criterion 31 | Is the Vehicle Running at a Low Speed (Equal to or Lower Than an Arbitrary Threshold)? (Acquired By Vehicle-Mounted Device) | 8 | ○ |
| Criterion 32 | Do the Lights Stay Lit? (Acquired By Vehicle-Mounted Device) | 4 | × |
| Criterion 33 | Is a Winker Operating? (Acquired By Vehicle-Mounted Device) | 4 | × |
| Criterion 34 | Is the Wiper Operating? (Acquired By Vehicle-Mounted Device) | 4 | × |
| ⋮ | ⋮ | ⋮ | ⋮ |
| Determination Result (8 or More: High-Risk Zone Less Than 8: Safe Zone) | | Sum Total :11 | High-Risk Zone |

FIG.34

| Number | Criterion Contents | Additional Criterion | Degree of Risk | Determination |
|---|---|---|---|---|
| Criterion 1 | Is the Running Zone an Accident Danger Zone? | – | 9 | × |
| Criterion 2 | Is There Any Elementary School in the Surrounding Area of the Vehicle? | During School Commute Times | 10 | × |
| | | Except During School Commute Times | 3 | ○ |
| Criterion 3 | Is There Any Shopping Center in the Surrounding Area of the Vehicle? | During Business Hours | 9 | × |
| ⋮ | ⋮ | | ⋮ | ⋮ |
| Criterion 11 | Is There Any Pedestrian in the Surrounding Area of the Vehicle? | Area Having a Radius of Less Than 3m | 9 | × |
| | | Area Having a Radius from 3m to 5m | 5 | × |
| Criterion 12 | Is There Any Light Vehicle or Any Motorbike in the Surrounding Area of the Vehicle? | Area Having a Radius of Less Than 5m | 8 | × |
| | | Area Having a Radius from 5m to 7m | 4 | × |
| Criterion 13 | Is There Any Other Vehicle in the Surrounding Area of the Vehicle? | Area Having a Radius of Less Than 5m | 8 | × |
| | | Area Having a Radius from 5m to 10m | 3 | × |
| ⋮ | ⋮ | | ⋮ | ⋮ |
| Criterion 21 | Is There Any Obstacle in the Surrounding Area of the Vehicle? | Area Having a Radius of Less Than 3m | 9 | × |
| | | Area Having a Radius from 3m to 5m | 5 | × |
| Criterion 22 | Is the Vehicle Running through a School Zone? | During School Commute Times | 10 | × |
| | | Except During School Commute Times | 3 | ○ |
| Criterion 23 | Is the Road Width Narrow? | Less Than 5m | 6 | × |
| | | 5m to 10m | 3 | × |
| Criterion 24 | Is the Vehicle Running through an Intersection? | – | 4 | × |
| ⋮ | ⋮ | | ⋮ | ⋮ |
| Criterion 31 | Is the Vehicle Running at a Low Speed (Equal to or Lower Than an Arbitrary Threshold)? | Speed Less Than 20km/h | 9 | × |
| | | Speed from 20 to 30 km/h | 4 | ○ |
| Criterion 32 | Do the Lights Stay Lit? | – | 4 | × |
| Criterion 33 | Is a Winker Operating? | – | 4 | × |
| Criterion 34 | Is the Wiper Operating? | – | 4 | × |
| ⋮ | ⋮ | | ⋮ | ⋮ |
| Determination Result (8 or More: High-Risk Zone Less Than 8: Safe Zone) | | | Sum Total :10 | High-Risk Zone |

SOUND-DIRECTED-OUTSIDE-VEHICLE EMITTING DEVICE

FIELD OF THE INVENTION

The present invention relates to a sound-directed-outside-vehicle emitting device mounted in a motor-driven vehicle, such as an electric vehicle, for emitting a sound directed outside the vehicle in order to alert pedestrians and so on to the presence of the vehicle.

BACKGROUND OF THE INVENTION

A motor-driven vehicle, such as an electric vehicle or a hybrid car, has a small running sound compared with combustion engine vehicles, and it is therefore difficult for surrounding pedestrians to perceive the running of such a motor-driven vehicle. Therefore, for the purpose of alerting an area surrounding a motor-driven vehicle running to the danger due to an approach of the vehicle, efforts to emit a warning sound, such as pseudo noise, directed outside a motor-driven vehicle running have been spread.

On the other hand, while a warning sound is emitted in a normal state, equipment of a sound emission temporary stop switch is also permitted provided that it is used only in a case in which the safeness of the surrounding area is ensured. When the vehicle is running through an area in which no pedestrians are walking, the driver can stop the emission of the warning sound (pseudo noise) by using the sound emission temporary stop switch.

However, when the driver can control the emission and stop of the warning sound freely, there is a possibility that if the emission of the warning sound is held stopped, the warning sound may not emit when important even in situations in which the warning sound is required.

Furthermore, although a system that automatically emits a warning sound according to various criteria, such as a road state outside the vehicle, a time zone, the presence or absence of pedestrians, has been proposed in recent years, when the user stops the emission of the warning sound, a time lag occurs unavoidably before the warning sound is outputted automatically after the user has stopped the emission of the warning sound.

In addition, when the user controls the system arbitrarily to stop the warning sound under conditions that the safeness is not ensured, there is a possibility that a running time interval during which pedestrians do not notice an approach of the vehicle occurs. This possibility does not satisfy the essential purpose of the warning sound emitting device, and causes a high risk of accidents.

For example, patent reference 1 discloses a vehicle warning device including a restriction prohibiting means for, when a start of the vehicle (self-vehicle) is detected, prohibiting the stop of a warning or reduction of the output level of the warning even if the distance between the vehicle and any other vehicle is equal to or smaller than a reference distance.

However, this device is not based on a case in which the user can control the emission and the stop of the warning, and is limited to operations at the time of starting the vehicle.

Therefore, in a case in which the vehicle exists in an area in which the vehicle needs to emit the warning sound directed outside the vehicle, the device cannot prevent the risk of the user stopping the warning sound.

The present invention is made in order to solve the above-mentioned problem, and it is therefore an object of the present invention to provide a sound-directed-outside-vehicle emitting device that enables a user to control whether to enable or disable the stop of a warning sound according to whether the vehicle is running through a high-risk (or dangerous) zone.

RELATED ART DOCUMENT

Patent Reference

Patent reference 1: JP, 2006-264525, A

SUMMARY OF THE INVENTION

A sound-directed-outside-vehicle emitting device in accordance with the present invention includes: a sound emitting unit for emitting a sound directed outside a vehicle; a storage unit for storing criteria by each of which to determine whether or not a running zone is a high-risk zone, each of the criteria describing a status of the vehicle; an information acquiring unit for acquiring information showing a status of the vehicle; a determining unit for comparing the information showing the status of the vehicle acquired by the information acquiring unit with the above-mentioned criteria read from the storage unit to determine whether or not the above-mentioned vehicle is running through a high-risk zone; and a control unit for controlling the output of the sound emitting unit while not stopping the output of the sound emitting unit when the determining unit determines that the vehicle is running through a high-risk zone even if a predetermined operation of commanding a stop of the output of the sound is performed thereon by something outside the sound-directed-outside-vehicle emitting device.

The sound-directed-outside-vehicle emitting device in accordance with the present invention includes the sound emitting unit for emitting the sound directed outside the vehicle, the storage unit for storing the criteria by each of which to determine whether or not the running zone is a high-risk zone, each of the criteria describing a status of the vehicle, and the information acquiring unit for acquiring information showing a status of the vehicle, and compares the information showing the status of the vehicle acquired by the information acquiring unit with the criteria read from the storage unit to determine whether or not the above-mentioned vehicle is running through a high-risk zone and does not stop the output of the sound emitting unit when determining that the vehicle is running through a high-risk zone even if the predetermined operation of commanding a stop of the output of the sound is performed thereon by something outside the sound-directed-outside-vehicle emitting device. Because the sound-directed-outside-vehicle emitting device is constructed in this way, the sound-directed-outside-vehicle emitting device can prohibit the output of the sound from being stopped arbitrarily by the user as long as it is determined from the status of the vehicle that the vehicle is running through a high-risk zone. As a result, the sound-directed-outside-vehicle emitting device can emit the sound certainly in the running zone in which the running of the vehicle should be noticed, and therefore can improve the safety in this running zone.

BRIEF DESCRIPTION OF THE FIGURES

FIG. 1 is a block diagram showing the whole configuration of a system to which a sound-directed-outside-vehicle emitting device in accordance with the present invention is applied;

FIG. 2 is a block diagram showing the whole configuration of a system to which a sound-directed-outside-vehicle emitting device in accordance with Embodiment 1 is applied;

FIG. 3 is a view showing an example (Example 1) of a determining table stored in a storage unit;

FIG. 4 is a view showing another example (Example 2) of the determining table stored in the storage unit;

FIG. 5 is a view showing another example (Example 3) of the determining table stored in the storage unit;

FIG. 6 is a view showing another example (Example 4) of the determining table stored in the storage unit;

FIG. 15 is a block diagram showing the whole configuration of a system to which a sound-directed-outside-vehicle emitting device in accordance with Embodiment 2 is applied;

FIG. 16 is a view showing an example (Example 1) of a determining table stored in a storage unit in accordance with Embodiment 2;

FIG. 17 is a view showing an example (Example 2) of the determining table stored in the storage unit in accordance with Embodiment 2;

FIG. 18 is a view showing an example (Example 3) of the determining table stored in the storage unit in accordance with Embodiment 2;

FIG. 19 is a flowchart showing a flow of the operation performed by the sound-directed-outside-vehicle emitting device in accordance with Embodiment 2;

FIG. 20 is a block diagram showing the whole configuration of a system to which a sound-directed-outside-vehicle emitting device in accordance with Embodiment 3 is applied;

FIG. 21 is a view showing an example (Example 1) of a determining table stored in a storage unit in accordance with Embodiment 3;

FIG. 22 is a view showing an example (Example 2) of the determining table stored in the storage unit in accordance with Embodiment 3;

FIG. 23 is a view showing an example (Example 3) of the determining table stored in the storage unit in accordance with Embodiment 3;

FIG. 25 is a block diagram showing the whole configuration of a system to which a sound-directed-outside-vehicle emitting device in accordance with Embodiment 4 is applied;

FIG. 26 is a view showing an example (Example 1) of a determining table stored in a storage unit in accordance with Embodiment 4;

FIG. 27 is a view showing an example (Example 2) of the determining table stored in the storage unit in accordance with Embodiment 4;

FIG. 28 is a view showing an example (Example 3) of the determining table stored in the storage unit in accordance with Embodiment 4;

FIG. 31 is a view showing an example (Example 1) of a determining table stored in a storage unit in accordance with Embodiment 5;

FIG. 32 is a view showing an example (Example 2) of the determining table stored in the storage unit in accordance with Embodiment 5;

FIG. 33 is a view showing an example (Example 3) of the determining table stored in the storage unit in accordance with Embodiment 5;

FIG. 34 is a view showing an example (Example 4) of the determining table stored in the storage unit in accordance with Embodiment 5.

EMBODIMENTS OF THE INVENTION

Figure 7:
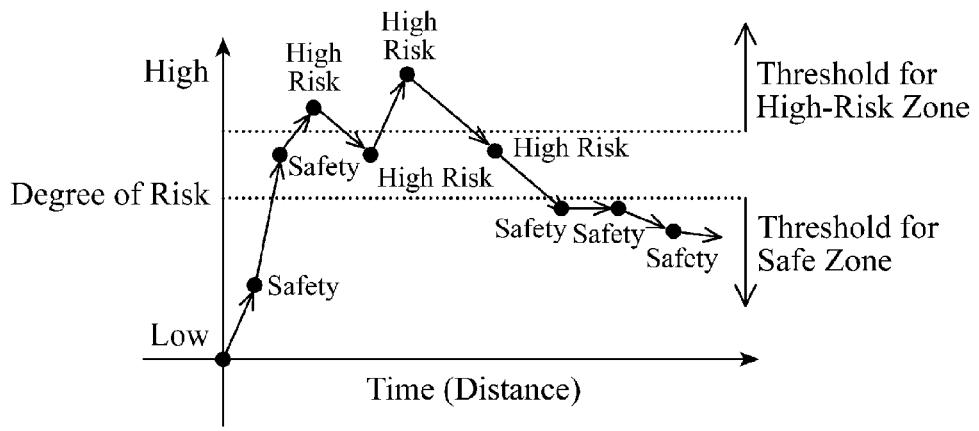
FIG. 7 is a view showing transitions between a safe zone and a high-risk zone which are made as a vehicle runs.

Hereafter, in order to explain this invention in greater detail, the preferred embodiments of the present invention will be described with reference to the accompanying drawings.

Embodiment 1

FIG. 1 is a block diagram showing the whole configuration of a system to which a sound-directed-outside-vehicle emitting device in accordance with the present invention is applied. In FIG. 1, this system is provided with a high-risk zone information acquiring device (an information acquiring unit) 1, a high-risk zone determining unit (a determining unit) 2, a storage unit (a storage unit) 2-A, an warning sound off control prohibiting device (a control unit) 3, a switch 4, an warning sound emitting device (the control unit) 5, a speaker for outside of vehicle 6, an in-vehicle speaker (a presentation unit), and a display unit (the presentation unit) 8. In the following explanation, a sound which is directed outside a vehicle to alert pedestrians and so on in an area surrounding the vehicle that the vehicle is running (i.e., make them notice that the vehicle is running) is referred to as a warning sound. Although the warning sound is not necessarily a sound, such as a siren, which reminds them of an emergency situation, the warning sound can be any kind of sound as long as the warning sound makes pedestrians and so on in the surrounding area of the vehicle notice the presence of the vehicle. Although it is desirable that the warning sound is a continuous sound which reminds pedestrians of the running state of a vehicle, such as a gasoline-powered vehicle, a diesel car, or a motorbike which has a conventional internal combustion engine as its source of power, the warning sound can be a sound which comes out of a whistle, a bell, a drum or the like.

The high-risk zone information acquiring device 1 is a unit for acquiring zone information about a zone through which the vehicle is running, and is comprised of at least one of a navigation device, a sensor unit, a camera unit, and a vehicle-mounted device. Examples of the high-risk zone information acquiring device 1 will be mentioned below in this Embodiment, and Embodiments 2 to 5.

The high-risk zone determining unit 2 is a component for determining whether or not a street zone along which the vehicle is running is a high-risk zone according to both the zone information about the zone through which the vehicle is running, which is acquired by the high-risk zone information acquiring device 1, and predetermined criteria stored in the storage unit 2-A.

The warning sound off control prohibiting device 3 is a unit for, when the high-risk zone determining unit 2 determines that the running zone of the vehicle is a high-risk zone, outputting a warning sound off control prohibiting signal to the switch 4 and the warning sound emitting device 5.

The switch 4 is the one (a temporary sound production stop switch) for enabling the user to perform on-off control of the warning sound. More specifically, an operation performed on the switch 4 corresponds to a predetermined operation of commanding a stop of the output of the warning sound (the sound directed outside the vehicle) which is done by something outside the system. When receiving the warning sound off control prohibiting signal, the switch 4 controls its output signal in such a way that the user cannot stop the warning sound arbitrarily.

The warning sound emitting device 5 which is a sound emitting unit is a unit for controlling the emission of the warning sound, and outputs the warning sound via the speaker for outside of vehicle 6. This warning sound is pseudo noise which is outputted outside the vehicle for the purpose of notifying people in the surrounding area of the vehicle of danger due to the approach of the vehicle. Furthermore, when receiving the warning sound off control prohibiting signal from the warning sound off control prohibiting unit 3, the warning sound emitting device 5 prohibits the off control of the warning sound irrespective of any control signal from the switch 4.

In addition, when the warning sound off control prohibiting signal is inputted to the warning sound emitting device 5, or when it is determined that the running zone of the vehicle is a high-risk zone, the warning sound off control prohibiting unit 3 outputs a warning sound off control prohibition notifying signal to both the in-vehicle speaker 7 and the display unit 8. As a result, the user is informed that the off control of the warning sound is prohibited and of the reason why the off control of the warning sound is prohibited via the in-vehicle speaker 7 or the display unit 8.

FIG. 2 is a block diagram showing the whole configuration of the system to which the sound-directed-outside-vehicle emitting device in accordance with Embodiment 1 is applied. In the system shown in FIG. 2, a navigation device 1-A is used as the high-risk zone information acquiring device 1 of FIG. 1.

The navigation device 1-A includes a map information database, a GPS receiver, and a communication unit for receiving information about a road along which the vehicle is running, and acquires current time information, current position information, running road information (including the width of the road, the type of the road, such as a general road or a highway, a speed limit, intersections, and curves), accident danger zone information, surrounding facility information, etc. to send those pieces of information to the high-risk zone determining unit 2.

The high-risk zone determining unit 2 can always monitor the contents of the above-mentioned pieces of information acquired by the navigation device 1-A, and, when the contents have changed, acquire the pieces of information from the navigation device 1-A again.

Furthermore, instead of always monitoring the contents of the pieces of information acquired by the navigation device 1-A, the high-risk zone determining unit 2 can acquire the above-mentioned pieces of information from the navigation device 1-A every time when the vehicle runs for a fixed duration or over a fixed distance. This fixed duration and the fixed running distance can be changed dynamically according to at least one of an environmental variation in the inside of the vehicle and an environmental variation in the outside of the vehicle. As this environmental variation, a change of the time zone, the vehicle speed, the weather, the surrounding facilities in the running zone, or the like can be taken. For example, in a time zone from 8:00 to 20:00, the number of times that the pieces of information are acquired can be increased by shortening the fixed duration and the fixed running distance, and in a time zone from 20:00 to 8:00, the number of times that the pieces of information are acquired can be decreased by lengthening the fixed duration and the fixed running distance. Furthermore, a mechanism, such as a switch, being able to set up the fixed duration and the fixed running distance can be disposed to change the fixed duration and the fixed running distance according to the user's operation. Thus, by dynamically changing the time at which the high-risk zone determining unit acquires the pieces of information, the high-risk zone determining unit can carry out the process with a high degree of efficiency.

In a case of emitting the warning sound only when the vehicle is running at a low speed, the high-risk zone determining unit 2 can always collect only the vehicle speed information from the navigation device 1-A, and, when the vehicle speed falls within a predetermined low vehicle speed range, acquire information other than the vehicle speed information, among the pieces of information used for the above-mentioned high-risk zone determination, whereas when the vehicle speed does not fall within the predetermined low vehicle speed range (e.g., when the vehicle is running at a high speed), the high-risk zone determining unit can acquire nothing other than the vehicle speed information. Furthermore, the information which the high-risk zone determining unit collects at all times can be anything other than the vehicle speed information as long as the high-risk zone determining unit can grasp the running speed of the vehicle from the information.

By using the above-mentioned pieces of information acquired from the navigation device 1-A, and the predetermined criteria stored in the storage unit 2-A, the high-risk zone determining unit 2 checks to see the degree of risk of the zone through which the vehicle is running, and determines whether or not the running zone is a high-risk zone in which there is a high risk of accidents if the user turns off the warning sound arbitrarily.

When determining that the running zone is a high-risk zone, the high-risk zone determining unit 2 informs the warning sound off control prohibiting unit 3 that the running zone is a high-risk zone.

FIG. 3 is a view showing an example (Example 1) of a determining table stored in the storage unit 2-A, and shows the determining table in which the criteria by each of which to determine that the running zone of the vehicle is a high-risk zone are summarized, together with examples of the determination result obtained by the high-risk zone determining unit 2. The high-risk zone determining unit 2 determines whether or not the running zone is a high-risk zone by determining whether each of the criteria described in the determining table shown in FIG. 3 is met for the running zone of the vehicle according to the above-mentioned pieces of information acquired from the navigation device 1-A. The example of FIG. 3 shows a case in which the high-risk zone determining unit determines whether or not each of the criteria is met in order of increasing numeral identifying each criterion, and determines that the running zone of the vehicle meets "Is the vehicle running through an intersection?" which is criterion 3. Thus, when one of the criteria described in the determining table is met, the high-risk zone determining unit determines that the running zone of the vehicle is a high-risk zone.

FIG. 4 is a view showing another example (Example 2) of the determining table stored in the storage unit 2-A, and shows the determining table in which the criteria by each of which to determine that the running zone of the vehicle is a high-risk zone are summarized, a criterion about the running time of the vehicle being added to each of some of them, together with examples of the determination result obtained by the high-risk zone determining unit 2. The high-risk zone determining unit 2 determines whether or not the running zone is a high-risk zone by determining whether each of the criteria described in the determining table shown in FIG. 4, together with an additional criterion, is met for the running zone of the vehicle according to the above-mentioned pieces of information acquired from the navigation device 1-A.

The example of FIG. 4 shows a case in which the high-risk zone determining unit determines whether or not each of the criteria is met in order of increasing numeral identifying each criterion, and determines that the running zone of the vehicle meets "Is there any elementary school in the surrounding area of the vehicle?" which is criterion 2 and "During school commute times" which is an additional criterion. Thus, when one of the criteria with an additional criterion described in the determining table is met, the high-risk zone determining unit determines that the running zone of the vehicle is a high-risk zone.

Even if the running zone of the vehicle meets "Is there any elementary school in the surrounding area of the vehicle?" which is criterion 2, the high-risk zone determining unit does not determine that the running zone of the vehicle is a high-risk zone unless the running time of the vehicle does not meet "During school commute times" which is an additional criterion.

FIG. 5 is a view showing a further example (Example 3) of the determining table stored in the storage unit 2-A, and shows the determining table in which the criteria by each of which to determine that the running zone of the vehicle is a high-risk zone are summarized, a score (a degree of risk) showing the degree of risk corresponding to the contents of each criterion being added to the criterion, together with examples of the determination result obtained by the high-risk zone determining unit 2. For example, the largest degree of risk is set to 10 and the smallest degree of risk is set to 1, and degrees of risk between them are set to levels 2 to 9.

The high-risk zone determining unit 2 determines whether or not each of the criteria is met in order of increasing numeral identifying each of the criteria, and, when the degree of risk associated with the criterion which the running zone of the vehicle meets is equal to or larger than a predetermined threshold, determines that the running zone is a high-risk zone, or otherwise determines that the running zone is not a high-risk zone. Furthermore, in a case in which the running zone of the vehicle meets two or more criteria, if the sum total of the degrees of risk associated with these criteria is equal to or larger than the predetermined threshold, the high-risk zone determining unit determines that the running zone is a high-risk zone, or otherwise determines that the running zone is not a high-risk zone.

In the example of FIG. 5, the threshold regarding degrees of danger is set to "8" and the running zone of the vehicle meets the contents of criterion 3: "Is the vehicle running through an intersection?", and the contents of criterion 4: "Will the vehicle make a right or left turn?". In this case, because "9" which is the sum total of the degree of risk of "4" corresponding the contents of criterion 3 and the degree of risk of "5" corresponding the contents of criterion 4 is equal to or larger than the above-mentioned threshold of "8", it is determined that the running zone is a "high-risk zone".

FIG. 6 is a view showing another example (Example 4) of the determining table stored in the storage unit 2-A, and shows the determining table in which the criteria by each of which to determine that the running zone of the vehicle is a high-risk zone are summarized, a criterion about the running time of the vehicle being added to each of some of them and a degree of risk corresponding to each criterion being added to the criterion, together with examples of the determination result obtained by the high-risk zone determining unit 2.

In the determining table shown in FIG. 5, although a degree of risk of "5" is added to the contents of the following criterion: "Is there any elementary school in the surrounding area of the vehicle?", for example, in a time zone, except during school commute times, in which there is a low pedestrian flow, such the degree of risk is excessive.

Therefore, as shown in FIG. 6, a time period: "Except during school commute times" is added, as an additional criterion, to the contents of the criterion: "Is there any elementary school in the surrounding area of the vehicle?", and, in this case in which these criteria are met, the degree of risk is set to "3", and a time period: "During school commute times" is also added, as an additional criterion, to the contents of the criterion, and, in this case in which these criteria are met, the degree of risk is set to "10" which is the highest level because an increasing pedestrian flow can be expected.

In the example of FIG. 6, the threshold regarding degrees of risk is set to "8", and the running zone of the vehicle meets the contents of criterion 2: "Is there any elementary school in the surrounding area of the vehicle?" and the contents of its additional criterion: "During school commute times", and also meets the contents of criterion 4: "Is the vehicle running through an intersection?". In this case, because "15" which is the sum total of the degree of risk of "10" corresponding the contents of criterion 2 and the contents of its additional criterion, and the degree of risk of "5" corresponding the contents of criterion 4 is equal to or larger than the threshold of "8", it is determined that the running zone is a "high-risk zone".

Furthermore, as the criteria by each of which to determine whether or not the running zone of the vehicle is a high-risk zone, the following examples can be provided.

First, when the road width of the road along which the vehicle is running, the road width being specified by the running road information, is narrow (the road width is equal to shorter than a predetermined road width), when the vehicle is running through an intersection or a curve, or when the vehicle will make a right or left turn, it can be determined that the running zone of the vehicle is a high-risk zone.

Furthermore, when the vehicle is running along a highway, it can be determined that the vehicle is not running through a high-risk zone, and, when the vehicle is running in a service area, it can be determined that the vehicle is running through a high-risk zone.

In addition, because there is a high possibility that the vehicle is running through a zone with many pedestrians, such as a residential street, when the road along which the vehicle is running has a low speed limit, it can be determined that the vehicle is running through a high-risk zone as long as the speed limit is equal to or smaller than an arbitrary threshold.

Because there is a high risk of children running into the road, many pedestrians walking in the surrounding area of the vehicle, and so on when the road along which the vehicle is running is in an accident danger zone, or when a facility, such as an elementary school or a shopping center, exists in the surrounding area of the vehicle, it can be determined that the vehicle is running through a high-risk zone.

In a case of using the current time information, it can be determined that the vehicle is running through a high-risk zone when the current time zone is the one which is determined to have a risk of accidents if running in a warning sound stop state.

For example, because the sound made by the vehicle running can become difficult to be heard in a time zone in which the surrounding noise becomes large, it is determined that the vehicle is running through a high-risk zone. Furthermore, because the driver's angle of visibility becomes narrow in a time zone in which the surroundings become dark, it can be determined that the vehicle is running through a high-risk zone. In this case, because people in the surrounding area of the vehicle visually and easily notice the vehicle running if the vehicle stays lit up, it can be determined that the vehicle is not running through a high-risk zone as long as the vehicle stays lit up.

Furthermore, instead of determining whether or not the running zone is a high-risk zone on the basis of only one criterion, the high-risk zone determining unit can determine whether or not the zone through which the vehicle is running is a high-risk zone on the basis of a combination of the surrounding facility information and the current time information.

For example, because even if a shopping center exists in the surrounding area of the vehicle, the pedestrian flow decreases after stores have been closed, the high-risk zone determining unit can determine that the running zone is a high-risk zone from a combination with the current time information when the stores are open for business, whereas the high-risk zone determining unit can determine that the running zone is not a high-risk zone after their closing times.

In addition, when a criterion by which to determine that the vehicle is running from a safe zone to a high-risk zone is the same as that by which to determine that the vehicle is running from the high-risk zone to the safe zone, there is a possibility that the determination result may change unnecessarily and frequently while the vehicle is running through the boundary between the high-risk zone and the safe zone.

To solve this problem, when updating the determination from a high-risk zone to a safe zone, instead of determining that the vehicle is running through a high-risk zone from only one-time determination result, the high-risk zone determining unit can update the determination from a safe zone to a high-risk zone when continuously determining that the vehicle is running through a high-risk zone multiple times.

FIG. 7 is a view showing movements between a safe zone and a high-risk zone as the vehicle runs, and shows a case in which a difference is provided between a threshold set for degrees of risk which are used for determination of whether or not the vehicle is running through a safe zone, and a threshold set for degrees of risk which are used for determination of whether or not the vehicle is running through a high-risk zone. In order to solve the problem that the determination result frequently changes while the vehicle is running across the boundary as mentioned above between a high-risk zone and a safe zone, a difference is provided between the threshold set for degrees of risk which are used for determination of whether or not the vehicle is running through a safe zone, and the threshold set for degrees of risk which are used for determination of whether or not the vehicle is running through a high-risk zone, as shown in FIG. 7, and the high-risk zone determining unit determines whether or not the vehicle is running through a high-risk zone according to a predetermined rule while the vehicle is running through the border area.

In the example of FIG. 7, as the above-mentioned predetermined rule, there is provided a rule to, once the vehicle has a degree of risk exceeding the threshold showing a start of a high-risk zone, maintain the determination that the vehicle is running through a high-risk zone until the degree of risk becomes equal to or lower than the threshold showing a start of a safe zone, and, even if the degree of risk of the vehicle running through the safe zone exceeds the threshold showing a start of the safe zone, determine that the vehicle is running through the safe zone. As a result, the high-risk zone determining unit can prevent the determination result from changing frequently when the degree of risk of the vehicle falls within a degree-of-risk region corresponding to the difference between the threshold set for degrees of risk which are used for determination of whether or not the vehicle is running through a safe zone, and the threshold set for degrees of risk which are used for determination of whether or not the vehicle is running through a high-risk zone.

Figure 8:
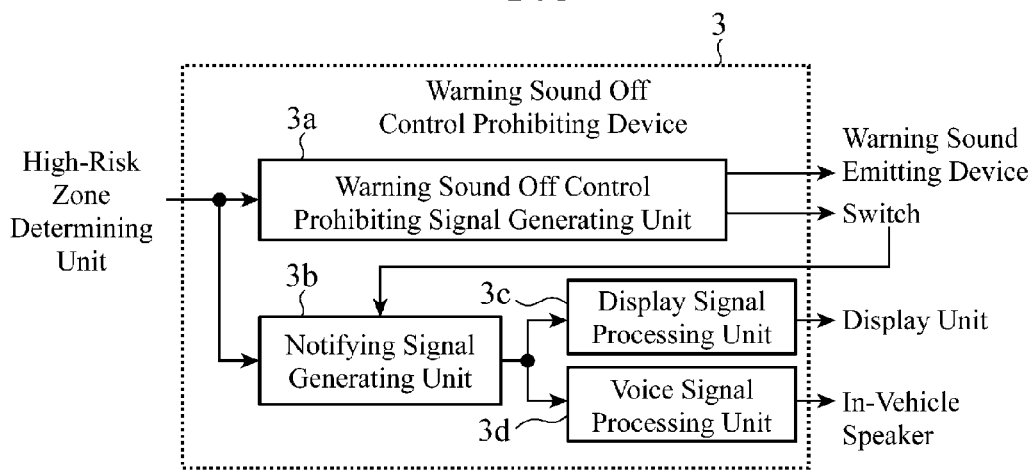
FIG. 8 is a block diagram showing the structure of a warning sound off control prohibiting device shown in FIGS. 1 and 2.

FIG. 8 is a block diagram showing the structure of the warning sound off control prohibiting unit shown in FIGS. 1 and 2. As shown in FIG. 8, the warning sound off control prohibiting unit 3 is provided with a warning sound off control prohibiting signal generating unit 3a, a notifying signal generating unit 3b, a display signal processing unit 3c, and a voice signal processing unit 3d.

The warning sound off control prohibiting signal generating unit 3a is a component for generating a signal to prohibit the off control of the warning sound to send this signal to the switch 4 or the warning sound emitting device 5 when the high-risk zone determining unit 2 determines that the running zone is a high-risk zone.

The notifying signal generating unit 3b is a component for always monitoring the state of the warning sound off control, and for generating a warning sound off control prohibition notifying signal to send this warning sound off control prohibition notifying signal to the display signal processing unit 3c and the voice signal processing unit 3d when the state of the warning sound off control has changed because of a new determination result of whether or not the running zone is a high-risk zone.

The warning sound off control prohibition notifying signal notifies the user of the state of the warning sound off control, for example, a stop or start of prohibiting the warning sound off control, a start or stop of a high-risk zone notification, or a start of stop of disabling the switch 4.

The display signal processing unit 3c and the voice signal processing unit 3d are components for converting the warning sound off control prohibition notifying signal sent thereto from the notifying signal generating unit 3b into signals which can be outputted via the display unit 8 and the in-vehicle speaker 7, and for outputting the signals to the display unit 8 and the in-vehicle speaker 7, respectively.

The notifying signal generating unit 3b generates the warning sound off control prohibition notifying signal showing that the warning sound off control is prohibited, the vehicle is running through a high-risk zone, or the switch is disabled even though the switch 4 is pushed down while the warning sound off control is prohibited. Also in this case, the display signal processing unit 3c and the voice signal processing unit 3d convert the warning sound off control prohibition notifying signal sent thereto from the notifying signal generating unit 3b into the signals which can be outputted via the display unit 8 and the in-vehicle speaker 7, and output them, respectively.

The switch 4 is operated arbitrarily by the user so as to carry out at least the off control of the warning sound. As the switch 4, a switch that carries out only the off control of the warning sound according to an operation, such as a push-down, can be used. As an alternative, a switch that carries out both on control and the off control of the warning sound can be used.

When the switch 4 receives the warning sound off control prohibiting signal from the warning sound off control prohibiting unit 3, the sound-directed-outside-vehicle emitting device disables the off control of the warning sound even if the user performs an operation of switching off the warning sound using the switch 4. For example, the sound-directed-outside-vehicle emitting device has a mechanism of disabling the switching off operation by locking the switch in the on state.

Furthermore, by mounting display equipment, such as LEDs (Light Emitting Diodes), to the switch 4 to directly display a state of whether the warning sound off control is prohibited or the off control is enabled, the user is enabled to verify the warning sound off control state at the same time when operating the switch 4 without taking the trouble to listen the in-vehicle speaker 7 or watch the display unit 8.

Figure 9:
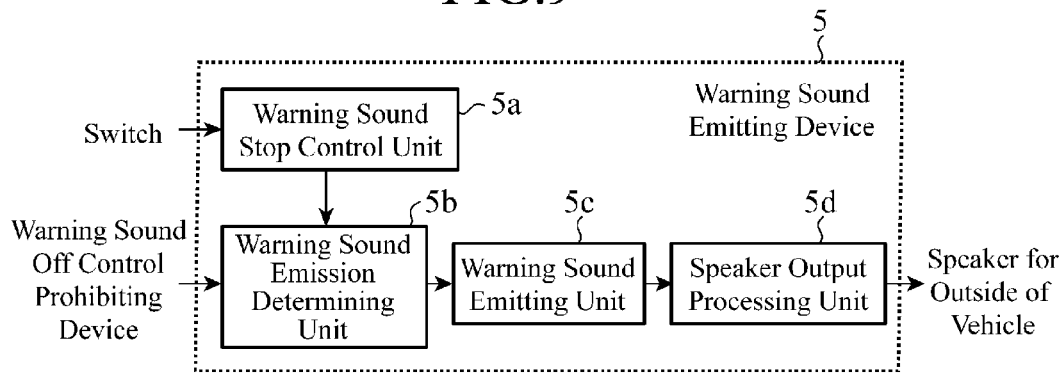
FIG. 9 is a block diagram showing the structure of a warning sound emitting device shown in FIGS. 1 and 2.

FIG. 9 is a block diagram showing the structure of the warning sound emitting device shown in FIGS. 1 and 2. In FIG. 9, the warning sound emitting device 5 constructs the warning sound emitting system, and is provided with a warning sound stop control unit 5a, a warning sound emission determining unit 5b, a warning sound emitting unit 5c, and a speaker output processing unit 5d.

The warning sound stop control unit 5a is a component for determining whether either an on operation or an off operation is performed on the switch 4 when the switch 4 is pushed down and sends a warning sound on signal or a warning sound off signal to the warning sound emission determining unit 5b.

The warning sound emission determining unit 5b is a component for, when receiving the warning sound on signal from the warning sound stop control unit 5a, outputting a command for emitting the warning sound to the warning sound emitting unit 5c, whereas when receiving the warning sound off signal, outputting a command for stopping the emission of the warning sound to the warning sound emitting unit 5c.

When the warning sound off control prohibiting signal is sent thereto from the warning sound off control prohibiting unit 3, the warning sound emission determining unit 5b determines not to stop the emission of the warning sound irrespective of the presence or absence of the warning sound off signal according to an operation on the switch 4. That is, the warning sound off control prohibiting signal sent from the warning sound off control prohibiting unit 3 has a higher priority in the determination of whether to emit the warning sound is higher than that of the operation signal of the switch 4 (the warning sound off control signal).

The warning sound emitting unit 5c is a component for generating warning sound data, and, when commanded to emit the warning sound by the warning sound emission determining unit 5b, outputs the warning sound data to the speaker output processing unit 5d, whereas when commanded to stop the warning sound by the warning sound emission determining unit 5b, the warning sound emitting unit stops the generation of the warning sound data and outputs nothing to the speaker output processing unit 5d. The speaker output processing unit 5d is a component for performing an acoustic process, such as a process of handling the number of channels or amplification of a sound volume, on the warning sound data received from the warning sound emitting unit 5c in such a way as to be able to appropriately output the sound via the speaker for outside of vehicle 6.

Figure 10:
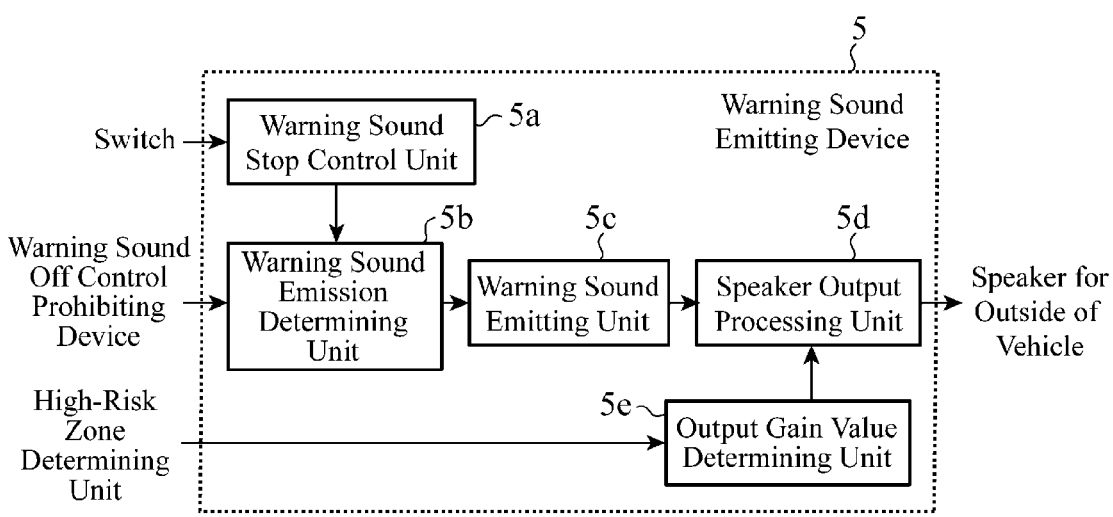
FIG. 10 is a block diagram showing another example of the structure of the warning sound emitting device shown in FIGS. 1 and 2.

FIG. 10 is a block diagram showing the other structural components of the warning sound emitting device shown in FIGS. 1 and 2. The warning sound emitting device 5 shown in FIG. 10 includes an output gain value determining unit 5e in addition to the structure shown in FIG. 9. The output gain value determining unit 5e is a component for setting up the gain value of the warning sound to be outputted according to the degree of risk which is determined by the high-risk zone determining unit 2. The speaker output processing unit 5d controls the volume of the warning sound to be outputted by using the gain value set up by the output gain value determining unit 5e.

The speaker for outside of vehicle 6 is one or more speakers mounted outside the vehicle, and are used for the emission of the warning sound. The in-vehicle speaker 7 is one or more speakers equipped in the vehicle.

The display unit 8 is display equipment, such as a display equipped in the vehicle, and can include a car navigation, LEDs, and the display equipment of the instrument panel.

The in-vehicle speaker 7 or the display unit 8 receives the warning sound off control prohibition notifying signal from the warning sound off control prohibiting unit 3, and notifies the user that the user cannot perform the off operation of switching off the warning sound by using the switch 4, or the user cannot stop the warning sound. Furthermore, when the user pushes down the switch 4 accidentally to a warning sound off position while the vehicle is running through a high-risk zone, the sound-directed-outside-vehicle emitting device notifies the user that the user cannot perform the off operation of switching off the warning sound by using the switch 4, or the user cannot stop the warning sound. The above-mentioned notification to the user is made by using at least one of the in-vehicle speaker 7 and the display units 8.

Next, the operation of the sound-directed-outside-vehicle emitting device will be explained.

Figure 11:
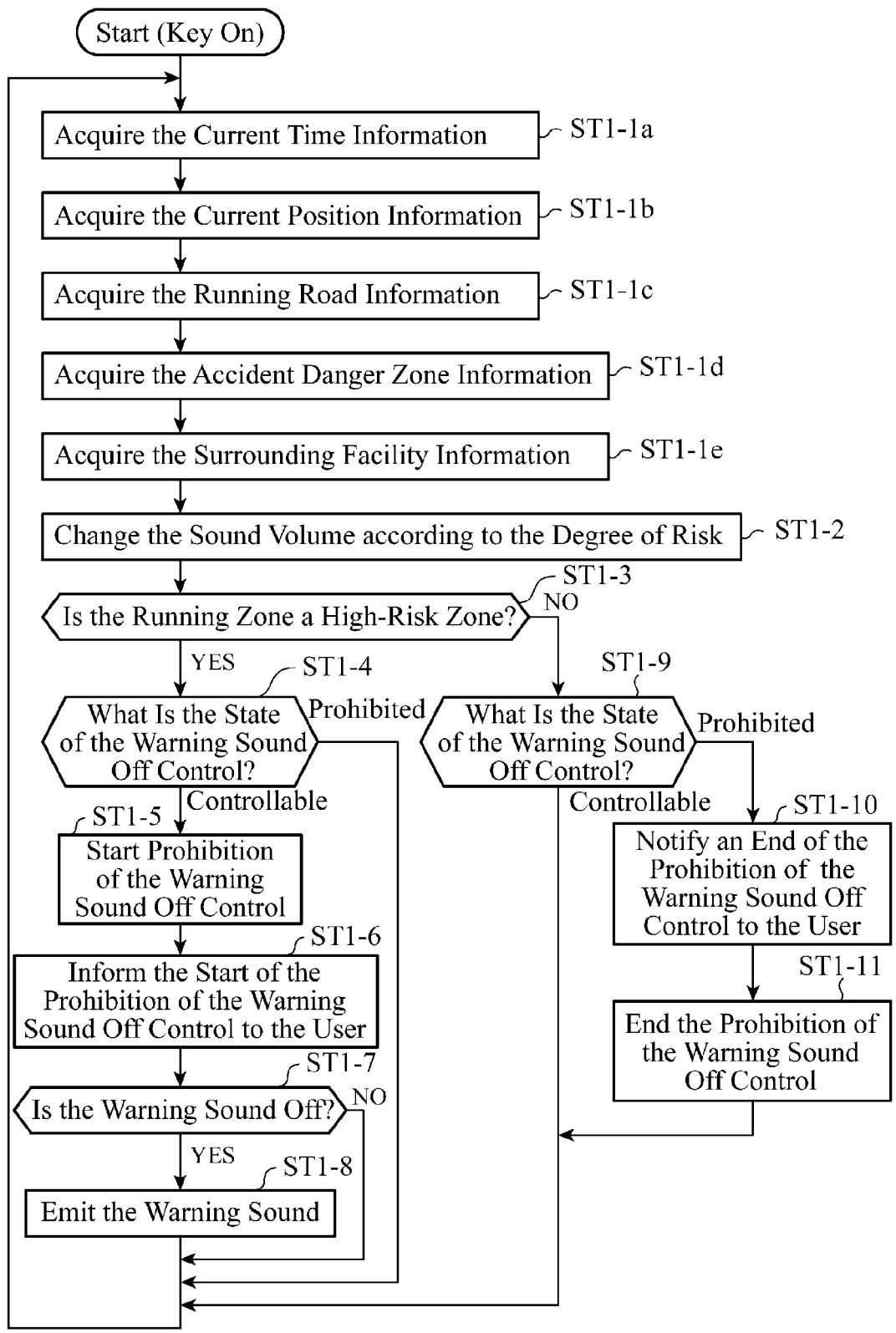
FIG. 11 is a flowchart showing a flow of the operation performed by the sound-directed-outside-vehicle emitting device in accordance with Embodiment 1.

FIG. 11 is a flow chart showing a flow of the operation performed by the sound-directed-outside-vehicle emitting device in accordance with Embodiment 1, and shows the details of warning sound emission processing including a determination of whether to prohibit the off control of the warning sound according to the degree of risk of the running zone of the vehicle.

First, when the key switch of the vehicle is turned on, the navigation device 1-A receives an electric power supply from a battery which is a main power supply, and then starts. Next, the navigation device 1-A acquires the current time information from the GPS receiver (step ST1-1a), and also acquires the current position information (step ST1-1b). The navigation device 1-A further acquires the running road information, the accident danger zone information, and the surrounding facility information from the map information database according to the current position information as the vehicle runs (steps ST1-1c, ST1-1d and ST1-1e). These pieces of information are outputted from the navigation device 1-A to the high-risk zone determining unit 2.

The high-risk zone determining unit 2 checks to see the degree of risk of the road zone along which the vehicle is running on the basis of both the information about the running zone of the vehicle inputted from the navigation device 1-A, and the predetermined criteria read from the storage unit 2-A, and informs the degree of risk to the output gain value determining unit 5e.

The output gain value determining unit 5e determines the gain value at which the device outputs the warning sound according to the degree of risk inputted from the high-risk zone determining unit 2, and sets the gain value to the speaker output processing unit 5d. As a result, the speaker output processing unit 5d changes the output sound volume of the warning sound according to the output gain value set thereto by the output gain value determining unit 5e (step ST1-2).

For example, when the degree of risk inputted from the high-risk zone determining unit 2 is larger than a predetermined threshold, the output gain value determining unit 5e increases the gain value, or otherwise decreases the gain value.

The high-risk zone determining unit 2 can inform the degree of risk to the output gain value determining unit 5e according to the number of times that one of the criteria by which to determine whether or not the running zone is a high-risk zone is met, the criteria being held by the storage unit 2-A. For example, when the number of times that one of the criteria by which to determine whether or not the running zone is a high-risk zone is met becomes equal to or larger than a predetermined threshold, the high-risk zone determining unit informs the degree of risk to the output gain value determining unit 5e.

Furthermore, the high-risk zone determining unit 2 can convert the degree of risk associated with each of the plural pieces of information acquired by the navigation device 1-A into a score to determine the degree of risk according to the score associated with each of the plural pieces of information or the sum total of the scores associated with the plural pieces of information. For example, the high-risk zone determining unit adds a score showing the degree of risk according to whether the current time information shows a time zone with a large pedestrian flow, such as "school commute times", adds a score showing the degree of risk according to whether the current position information shows a position in the vicinity of a facility, such as an "elementary school", in which many persons are accommodated, adds a score showing the degree of risk according to whether the running road information shows a road facing such a facility as above, adds a score showing the degree of risk according to whether the accident danger zone information shows that accidents have occurred frequently in the running zone, and adds a score showing the degree of risk according to whether the surrounding facility information shows that there is a nearby facility in which many persons are accommodated. The high-risk zone determining unit can define the scores associated with the plural pieces of information as the degrees of risk just they are, or define the sum total of the scores associated with the plural pieces of information as the degree of risk.

In the above-mentioned explanation, although the case in which the warning sound emitting device 5 includes the output gain value determining unit 5e is shown, the process of changing the output sound volume of the warning sound (step ST1-2) is omitted in a case of a structure of not having the output gain value determining unit 5e, as shown in FIG. 9.

Next, the high-risk zone determining unit 2 determines whether or not the zone through which the vehicle is running is a high-risk zone on the basis of the pieces of information about the running zone of the vehicle acquired from the navigation device 1-A (the current time information, the current position information, the running road information, the accident danger zone information and the surrounding facility information), and the information showing the degree of risk which the high-risk zone determining unit has determined with reference to the pieces of running zone information and the predetermined criteria read from the storage unit 2-A (step ST1-3). When determining that the running zone is a high-risk zone (step ST1-3; YES), the high-risk zone determining unit 2 outputs the determination result showing that the running zone is a high-risk zone to the warning sound off control prohibiting unit 3, whereas when determining that the running zone is not a high-risk zone (step ST1-3; NO), the high-risk zone determining unit outputs the determination result showing that the running zone is not a high-risk zone to the warning sound off control prohibiting unit 3.

The off control of the warning sound is prohibited (step ST1-4; prohibited) if the warning sound off control prohibiting signal generating unit 3a in the warning sound off control prohibiting unit 3 has already generated the warning sound off control prohibiting signal at the time when the warning sound off control prohibiting unit 3 receives the determination result showing that the running zone is a high-risk zone from the high-risk zone determining unit 2, and the high-risk zone determining unit returns to the process in step ST1-1a.

In contrast, when no warning sound off control prohibiting signal has been generated at the time when the warning sound off control prohibiting unit 3 receives the determination result showing that the running zone is a high-risk zone, and the sound-directed-outside-vehicle emitting device is in a state in which the off control of the warning sound is enabled (step ST1-4; controllable), the warning sound off control prohibiting signal generating unit 3a generates a warning sound off control prohibiting signal, and outputs this signal to the switch 4 or the warning sound emitting device 5. When receiving the warning sound off control prohibiting signal, the switch 4 or the warning sound emitting device 5 starts to prohibit the off control of the warning sound according to an operation (a pushdown) on the switch 4 (step ST1-5).

When noticing a change in the state of the off control of the warning sound (a change in the prohibition of the off control) after receiving the determination result showing that the running zone is a high-risk zone from the high-risk zone determining unit 2, the notifying signal generating unit 3b generates a warning sound off control notifying signal, and outputs this signal to the display signal processing unit 3c and the voice signal processing unit 3d.

The notifying signal generating unit 3b can notice a change in the state of the off control of the warning sound according to whether the switch 4 has received the warning sound off control prohibiting signal, for example.

The display signal processing unit 3c and the voice signal processing unit 3d convert the warning sound off control prohibition notifying signal inputted thereto from the notifying signal generating unit 3b into signals which can be outputted via the display unit 8 and the in-vehicle speaker 7, and outputs the signals to the display unit 8 and the in-vehicle speaker 7, respectively. As a result, a start of the prohibition of the off control of the warning sound is informed to the user via the in-vehicle speaker 7 and the display unit 8 (step ST1-6).

At this time, when the switch 4 has been pushed down and the warning sound emitting unit 5c has not generated any warning sound data before commanded to emit the warning sound by the warning sound emission determining unit 5b (step ST1-7; YES), the warning sound emitting unit 5c generates warning sound data promptly and outputs this data to the speaker output processing unit 5d. As a result, the speaker output processing unit 5d emits the warning sound via the speaker for outside of vehicle (step ST1-8). After that, the sound-directed-outside-vehicle emitting device returns to the process in step ST1-1a.

In contrast, when it is determined, in step ST1-3, that the running zone is not a high-risk zone (it is a safe zone), the warning sound off control prohibiting signal generating unit 3a does not generate a warning sound off control prohibiting signal at the time of receiving the determination result showing that the running zone is not a high-risk zone from the high-risk zone determining unit 2, and the sound-directed-outside-vehicle emitting device is in a state in which the off control of the warning sound is enabled (step ST1-9; controllable), the sound-directed-outside-vehicle emitting device returns to the process in step ST1-1a.

Furthermore, when noticing that the off control of the warning sound is prohibited after receiving the determination result showing that the running zone is not a high-risk zone (it is a safe zone) from the high-risk zone determining unit 2 (step ST1-9; prohibited), the notifying signal generating unit 3b generates a warning sound off control notifying signal showing an end of the prohibition of the off control of the warning sound, and outputs this signal to the display signal processing unit 3c and the voice signal processing unit 3d.

The display signal processing unit 3c and the voice signal processing unit 3d convert the warning sound off control prohibition notifying signal inputted thereto from the notifying signal generating unit 3b into a signal which can be outputted via the in-vehicle speaker 7 or the display unit 8, and outputs the signal to the in-vehicle speaker 7 or the display unit 8. As a result, an end of the prohibition of the off control of the warning sound is informed to the user via the in-vehicle speaker 7 or the display unit 8 (step ST1-10).

Instead of informing the user about only a start and a stop of the prohibition of the off control of the warning sound, the sound-directed-outside-vehicle emitting device can continue informing the user that the off control of the warning sound is prohibited at all times or the like via the in-vehicle speaker 7 or the display unit 8 while the off control of the warning sound is prohibited.

When receiving the determination result showing that the running zone is not a high-risk zone from the high-risk zone determining unit 2, the warning sound off control prohibiting signal generating unit 3a stops the output of the warning sound off control prohibiting signal to the switch 4 or the warning sound emitting device 5. When the output of the warning sound off control prohibiting signal is stopped by the warning sound off control prohibiting signal generating unit 3a, the switch 4 or the warning sound emitting device 5 ends the prohibition of the off control of the warning sound (step ST1-11). After that, the sound-directed-outside-vehicle emitting device returns to the process in step ST1-1a.

Figure 12:
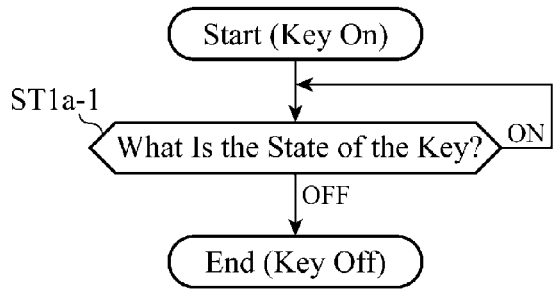
FIG. 12 is a flow chart showing a shutdown interrupt routine.

FIG. 12 is a flow chart showing a shutdown interrupt routine. While the sound-directed-outside-vehicle emitting device in accordance with Embodiment 1 performs the above-mentioned processing shown in FIG. 11, the processing is continued or ended according to the state of the key switch (step ST1a-1). When the key switch of the vehicle is in an on state (step ST1a-1; ON), the sound-directed-outside-vehicle emitting device continues the processing shown in FIG. 11. In contrast, when the key switch of the vehicle is turned off by the user (step ST1a-1; OFF), an interrupt occurs during the processing shown in FIG. 11 and the system is ended.

Figure 13:
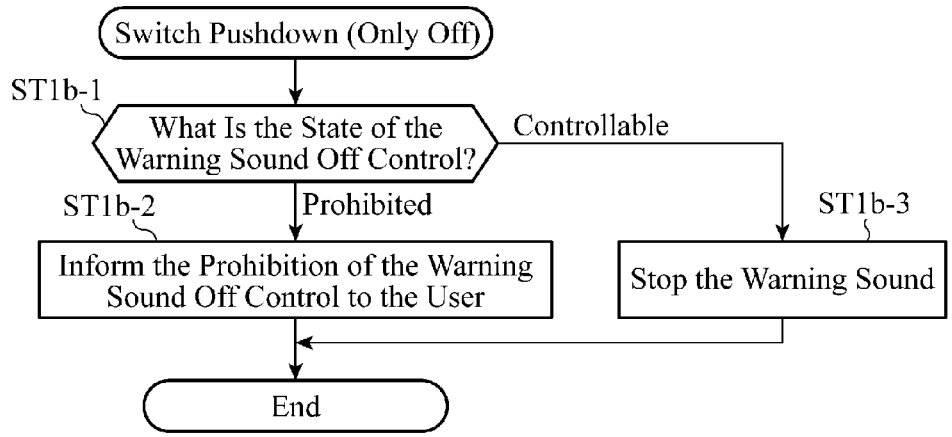
FIG. 13 is a flow chart showing a flow of an interrupt process according to a switch operation.

FIG. 13 is a flow chart showing a flow of an interrupt process according to a switch operation, and shows an interrupt process in a case in which only an operation of performing the off control of the emission of the warning sound using the switch 4 is allowed.

First, when the warning sound off control prohibiting signal is outputted to the switch 4 at the time of receiving an operation signal (a warning sound off control signal) caused by a pushdown of the switch 4 (step ST1b-1; prohibited), the notifying signal generating unit 3b generates a warning sound off control notifying signal showing that the off control of the warning sound is prohibited, and outputs this signal to the display signal processing unit 3c and the voice signal processing unit 3d.

As a result, the in-vehicle speaker 7 and the display unit 8 inform the user that the off control of the warning sound is prohibited under the control of the voice signal processing unit 3d and the display signal processing unit 3c (step ST1b-2), and the interrupt process is ended.

As the reason why the off control of the warning sound using the switch 4 must not be carried out, the high-risk zone determining unit 2 can present the criterion (the criterion item matching the status of the vehicle) by which the high-risk zone determining unit has determined that the running zone is a high-risk zone, via the warning sound off control prohibiting unit 3 and then the in-vehicle speaker 7 or the display unit 8, for the user.

In contrast, when receiving an operation signal caused by a pushdown of the switch 4, the warning sound stop control unit 5a in the warning sound emitting device 5 outputs the warning sound off signal for commanding a stop of the emission of the warning sound to the warning sound emission determining unit 5b. When not receiving the warning sound off control prohibiting signal from the warning sound off control prohibiting unit 3 at the time of receiving the warning sound off signal from the warning sound stop control unit 5a (step ST1b-1; controllable), the warning sound emission determining unit 5b commands the warning sound emitting unit 5c to stop the emission of the warning sound. The warning sound emitting unit 5c stops the output of the warning sound by stopping the generation of the warning sound data according to the command from the warning sound emission determining unit 5b (step ST1b-3), and the interrupt process is ended.

Figure 14:
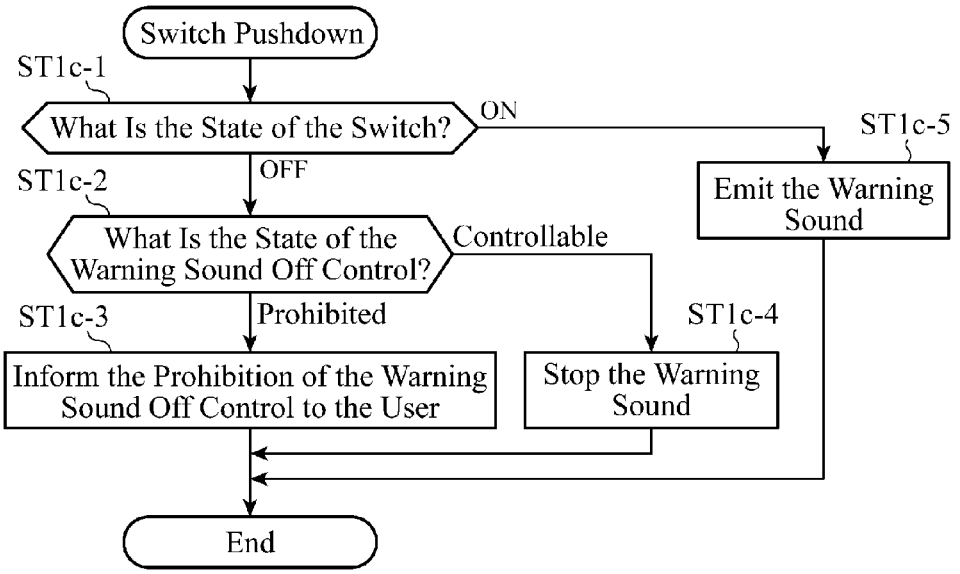
FIG. 14 is a flow chart showing a flow of another interrupt process according to a switch operation.

FIG. 14 is a flow chart showing a flow of another interrupt process according to a switch operation, and shows an interrupt process when both an operation of performing the off control of the emission of the warning sound using the switch 4, and an operation of performing the on control of the emission of the warning sound using the switch 4 are enabled.

First, the warning sound stop control unit 5a determines whether the off control or the on control has been carried out from an operation performed on the switch 4 (step ST1c-1). This determination result is outputted from the warning sound stop control unit 5a to the warning sound emission determining unit 5b.

On the other hand, when the notifying signal generating unit 3b notices that the switch 4 has received the warning sound off control prohibiting signal from the warning sound off control prohibiting unit 3 at the time when the operation of performing the off control of the warning sound using the switch 4 is performed (step ST1c-1; OFF), and the off control of the warning sound is prohibited (step ST1c-2; prohibited), the notifying signal generating unit 3b generates a warning sound off control notifying signal showing that the off control of the warning sound is prohibited, and outputs this signal to the display signal processing unit 3c and the voice signal processing unit 3d.

The display signal processing unit 3c and the voice signal processing unit 3d convert the warning sound off control prohibition notifying signal inputted thereto from the notifying signal generating unit 3b into a signal which can be outputted via the in-vehicle speaker 7 or the display unit 8, and outputs the signal to the in-vehicle speaker 7 or the display unit 8. As a result, the user is informed that the off control of the warning sound is prohibited via the in-vehicle speaker 7 or the display unit 8 (step ST1c-3), and the interrupt process is ended.

As the reason why the off control of the warning sound using the switch 4 must not be carried out, the high-risk zone determining unit 2 can present the criterion (the criterion item matching the status of the vehicle) by which the high-risk zone determining unit has determined that the running zone is a high-risk zone, via the warning sound off control prohibiting unit 3 and then the in-vehicle speaker 7 or the display unit 8, for the user.

When not receiving the warning sound off control prohibiting signal from the warning sound off control prohibiting unit 3 at the time of receiving the determination result showing that the operation of performing the off control of the warning sound has been done using the switch 4 (step ST1c-1; OFF), the warning sound emission determining unit 5b determines that the off control of the warning sound is enabled (step ST1b-1; controllable), and commands the warning sound emitting unit 5c to stop the emission of the warning sound. The warning sound emitting unit 5c stops the output of the warning sound by stopping the generation of the warning sound data according to the command from the warning sound emission determining unit 5b (step ST1b-4), and the interrupt process is ended.

Furthermore, when receiving the determination result showing that the operation of performing the off control of the warning sound has been done using the switch 4 from the warning sound stop control unit 5a (step ST1c-1; ON), the warning sound emission determining unit 5b commands the warning sound emitting unit 5c to emit the warning sound. The warning sound emitting unit 5c emits the warning sound by generating warning sound data according to the command from the warning sound emission determining unit 5b and then outputting the warning sound data to the speaker output processing unit 5d (step ST1c-5), and the interrupt process is ended.

As mentioned above, the sound-directed-outside-vehicle emitting device in accordance with this Embodiment 1 includes the storage unit 2-A for storing the criteria by each of which to determine whether or not the running zone is a high-risk zone, a status of the vehicle being described in each of the criteria, and the navigation device 1-A which is an information acquiring unit for acquiring pieces of information showing a status of the vehicle, and compares the time zone, the road width, the speed limit, the accident danger zone, the road type information, and the surrounding facility information, which are acquired by the navigation device 1-A, with the criteria read from the storage unit 2-A to determine whether or not the vehicle is running through a high-risk zone, and, even if an operation of commanding a stop of the output of the warning sound is performed on the switch 4 by something outside the sound-directed-outside-vehicle emitting device, does not stop the output of the warning sound when it is determined that the vehicle is running through a high-risk zone.

Because the sound-directed-outside-vehicle emitting device is constructed in this way, the sound-directed-outside-vehicle emitting device can prohibit the output of the warning sound from being stopped arbitrarily by the user as long as it is determined from the status of the vehicle that the vehicle is running through a high-risk zone. As a result, the sound-directed-outside-vehicle emitting device can emit the warning sound certainly in the running zone in which the running of the vehicle should be noticed, and therefore can improve the safety in the running zone.

Furthermore, existing vehicle-mounted navigation equipment can be used as the navigation device 1-A.

Embodiment 2

FIG. 15 is a block diagram showing the whole configuration of a system to which a sound-directed-outside-vehicle emitting device in accordance with Embodiment 2 of the present invention is applied. As shown in FIG. 15, the sound-directed-outside-vehicle emitting device in accordance with Embodiment 2 is provided with a sensor unit 1-B instead of the navigation device 1-A in the structure of FIG. 2 explained in above-mentioned Embodiment 1. The same structural components as those shown in FIGS. 1 and 2 or like structural components are designated by the same reference numerals as those shown in the figures, and the explanation of the components will be omitted hereafter.

The sensor unit 1-B is constructed in such a way as to have a sensor, such as an ultrasonic sensor or a millimeter wave radar, and this sensor is mounted to either of a front portion, a side portion and a rear portion of the vehicle body. As an alternative, one or more sensors are mounted to each of the front portion, the side portion and the rear portion of the vehicle body. Furthermore, the sensor unit includes a passive sensor for performing image analysis of an image obtained by shooting an area surrounding the vehicle to determine the type of an obstacle (a pedestrian, a light vehicle, a motorbike, another vehicle, or the like) in addition to the above-mentioned active sensor.

The sensor unit 1-B is also provided with an information processing unit for detecting an obstacle in the surrounding area of the vehicle, such as a pedestrian, a light vehicle, a motorbike or another vehicle, to acquire both information showing the type of the obstacle and distance information about the distance between the obstacle and the vehicle. The pieces of information thus acquired by the sensor unit 1-B are sent to a high-risk zone determining unit 2.

The time at which the sensor unit 1-B sends the pieces of information to the high-risk zone determining unit 2 is not necessarily determined by monitoring the monitor sensor unit 1-B at all times by the high-risk zone determining unit 2. For example, at fixed time intervals or every time when the vehicle runs a fixed distance, the high-risk zone determining unit 2 can acquire the pieces of information from the sensor unit 1-B. This time length of each time interval and the fixed distance can be changed dynamically according to at least one of an environmental variation in the inside of the vehicle and an environmental variation in the outside of the vehicle. As this environmental variation, a change of an obstacle in the surrounding area of the vehicle or the like can be taken. For example, when the vehicle is running through a zone with many obstacles in the surrounding area of the vehicle, the number of times that the pieces of information are acquired can be increased by shortening the time length of each time interval and the fixed running distance, whereas when the vehicle is running through a zone with few obstacles in the surrounding area of the vehicle, the number of times that the pieces of information are acquired can be decreased by lengthening the time length of each time interval and the fixed running distance. Furthermore, a mechanism, such as a switch, for making it possible to set the time length of each time interval and the fixed running distance can be disposed to allow the user to change them according to the user's operation. Thus, by dynamically changing the time at which the high-risk zone determining unit acquires the pieces of information, the high-risk zone determining unit can carry out the process with a high degree of efficiency.

The high-risk zone determining unit 2 checks to see the degree of risk of the zone through which the vehicle is running by using the pieces of information acquired from the sensor unit 1-B, and determines whether or not the running zone must be a high-risk zone in which there is a high risk of accidents if the user turns off a warning sound arbitrarily. When determining that the running zone must be a high-risk zone, the high-risk zone determining unit 2 informs a warning sound off control prohibiting unit 3 that the running zone is a high-risk zone.

FIG. 16 is a view showing an example (Example 1) of a determining table stored in a storage unit 2-A in accordance with Embodiment 2, and shows the determining table in which criteria by each of which to determine that the running zone of the vehicle is a high-risk zone are summarized, together with examples of the determination result obtained by the high-risk zone determining unit 2.

The high-risk zone determining unit 2 determines whether or not the running zone is a high-risk zone by determining whether each of the criteria described in the determining table shown in FIG. 16 is met for the running zone of the vehicle according to the above-mentioned pieces of information acquired from the sensor unit 1-B. The example of FIG. 16 shows a case in which the high-risk zone determining unit determines whether or not each of the criteria is met in order of increasing numeral identifying each criterion, and determines that the running zone of the vehicle meets "Is there any pedestrian in the surrounding area of the vehicle?" which is criterion 1.

Thus, when one of the criteria described in the determining table is met, the high-risk zone determining unit determines that the running zone of the vehicle is a high-risk zone.

FIG. 17 is a view showing a further example (Example 2) of the determining table stored in the storage unit 2-A in accordance with Embodiment 2, and shows the determining table in which the criteria by each of which to determine that the running zone of the vehicle is a high-risk zone are summarized, a score (a degree of risk) showing the degree of risk corresponding to the contents of each criterion being added to the criterion, together with examples of the determination result obtained by the high-risk zone determining unit 2. For example, the largest degree of risk is set to 10 and the smallest degree of risk is set to 1, and degrees of risk between them are set to levels 2 to 9, like in the case of Embodiment 1.

The high-risk zone determining unit 2 determines whether or not each of the criteria is met in order of increasing numeral identifying each of the criteria, and, when the degree of risk associated with the criterion which the running zone of the vehicle meets is equal to or larger than a predetermined threshold, determines that the running zone is a high-risk zone, or otherwise determines that the running zone is not a high-risk zone. Furthermore, in a case in which the running zone of the vehicle meets two or more criteria, if the sum total of the degrees of risk associated with these criteria is equal to or larger than the predetermined threshold, the high-risk zone determining unit determines that the running zone is a high-risk zone, or otherwise determines that the running zone is not a high-risk zone.

In the example of FIG. 17, the threshold regarding degrees of danger is "8" and the running zone of the vehicle meets the contents of criterion 1: "Is there any pedestrian in the surrounding area of the vehicle?". In this case, because "8" which is the degree of risk corresponding to the contents of criterion 1 is equal to or larger than the threshold of "8", it is determined that the running zone is a "high-risk zone".

FIG. 18 is a view showing another example (Example 3) of the determining table stored in the storage unit 2-A in accordance with Embodiment 2, and shows the determining table in which the criteria by each of which to determine that the running zone of the vehicle is a high-risk zone are summarized, an additional criterion about the distance between an obstacle and the vehicle being added to each criterion and a degree of risk corresponding to each criterion being added to the criterion, together with examples of the determination result obtained by the high-risk zone determining unit 2.

In the determining table shown in FIG. 17, although a degree of risk of "8" is added to the criterion: "Is there any pedestrian in the surrounding area of the vehicle?", for example, when all nearby pedestrians are apart at a predetermined distance or more from the vehicle, such the degree of risk is excessive.

Therefore, as shown in FIG. 18, a distance between pedestrians and the vehicle: "falling within an area having a radius of 3 m to 5 m" around the sensor unit 1-B for detecting pedestrians is added, as an additional criterion, to the contents of the criterion: "Is there any pedestrian in the surrounding area of the vehicle?", and the degree of risk for this criterion with the additional criterion is set to "5", and a distance between pedestrians and the vehicle: "falling within an area having a radius of less than 3 m" is also added, as an additional criterion, to the above-mentioned criterion, and the degree of risk for this criterion with the additional criterion is set to "9" because a risk of contact between the vehicle and a pedestrian can be expected.

In the example of FIG. 18, the threshold regarding degrees of risk is set to "8", and the running zone of the vehicle meets the contents of criterion 1: "Is there any pedestrian in the surrounding area of the vehicle?" and its additional criterion: "Within an area having a radius of less than 3 m", and also meets the contents of criterion 2: "Is there any light vehicle or motorbike in the surrounding area of the vehicle?" and its additional criterion: "Within an area having a radius of 5 m to 7 m". In this case, because "13" which is the sum total of the degree of risk of "9" corresponding the contents of criterion 1 and its additional criterion, and the degree of risk of "4" corresponding the contents of criterion 2 and its additional criterion is equal to or larger than the threshold "8", it is determined that the running zone is a "high-risk zone".

Furthermore, as the criteria by each of which to determine whether or not the running zone of the vehicle is a high-risk zone, the following examples can be provided.

First, when the distance between an obstacle and the vehicle which is detected by the sensor unit 1-B is short (the obstacle falls within an area having a radius of a predetermined distance around the sensor of the sensor unit 1-B which has detected the obstacle), when two or more obstacles exist, or when the distance between an obstacle and the vehicle becomes short with time, it can be determined that the running zone of the vehicle is a high-risk zone.

In addition, when a criterion by which to determine that the vehicle is running from a safe zone to a high-risk zone is the same as that by which to determine that the vehicle is running from the high-risk zone to the safe area, there is a possibility that the determination result may change unnecessarily and frequently while the vehicle is running through the boundary between the high-risk zone and the safe zone. To solve this problem, when updating the determination from a high-risk zone to a safe zone, instead of determining that the vehicle is running through a high-risk zone from only one-time determination result, the high-risk zone determining unit can update the determination from a safe zone to a high-risk zone when continuously determining that the vehicle is running through a high-risk zone multiple times.

Furthermore, as previously explained with reference to FIG. 7 in above-mentioned Embodiment 1, a difference can be provided between a threshold set for degrees of risk which are used for determination of whether or not the vehicle is running through a safe zone, and a threshold set for degrees of risk which are used for determination of whether or not the vehicle is running through a high-risk zone.

Furthermore, in Embodiment 2, the warning sound off control prohibiting unit 3 has the same structure as that of FIG. 8 shown in above-mentioned Embodiment 1. Each of a switch 4, a speaker for outside of vehicle 6, an in-vehicle speaker 7, and a display unit 8 has the same structure and function as those explained in above-mentioned Embodiment 1, too. In addition, a warning sound emitting device 5 has the same structure as that of FIG. 9 or 10 shown in above-mentioned Embodiment 1.

In the subsequent explanation, the structure of the sound-directed-outside-vehicle emitting device in accordance with Embodiment 2 will be explained with reference to FIGS. 8 to 10 in addition to FIG. 15.

Next, the operation of the sound-directed-outside-vehicle emitting device will be explained.

FIG. 19 is a flow chart showing a flow of the operation performed by the sound-directed-outside-vehicle emitting device in accordance with Embodiment 2, and shows the details of warning sound emission processing including determination of whether to carry out the off control of the warning sound according to the degree of risk of the running zone of the vehicle.

First, when the key switch of the vehicle is turned on, one or more sensors which construct the sensor unit 1-B, which are mounted to either of the front portion, the side portion and the rear portion of the vehicle body, or which are mounted to each of the front portion, the side portion and the rear portion of the vehicle body detect obstacles in the surrounding area of the vehicle, such as a pedestrian, a light vehicle, a motorbike, and another vehicle, and acquires information showing the type of each detected obstacle and distance information showing the distance between each detected obstacle and the vehicle (step ST2-1). The above-mentioned pieces of information acquired by the sensor unit 1-B are sent to the high-risk zone determining unit 2.

The high-risk zone determining unit 2 checks to see the degree of risk of the road zone along which the vehicle is running on the basis of the distance information showing the distance between each detected obstacle and the vehicle which is inputted from the sensor unit 1-B, and the predetermined criteria which are read from the storage unit 2-A, and informs the degree of risk of the road zone to an output gain value determining unit 5*e*.

The output gain value determining unit 5*e* determines the gain value at which the sound-directed-outside-vehicle emitting device outputs the warning sound according to the degree of risk inputted from the high-risk zone determining unit 2, and sets the gain value to a speaker output processing unit 5*d*. As a result, the speaker output processing unit 5*d* changes the output sound volume of the warning sound according to the output gain value set thereto by the output gain value determining unit 5*e* (step ST2-2).

For example, when the degree of risk inputted from the high-risk zone determining unit 2 is larger than a predetermined threshold, the output gain value determining unit 5*e* increases the gain value, or otherwise decreases the gain value.

The high-risk zone determining unit 2 can inform the degree of risk to the output gain value determining unit 5*e* according to the number of times that one of the criteria by which to determine whether or not the running zone is a high-risk zone is met, the criteria being held by the storage unit 2-A.

For example, when the number of times that one of the criteria by which to determine whether or not the running zone is a high-risk zone is met becomes equal to or larger than a predetermined threshold, the high-risk zone determining unit informs the degree of risk to the output gain value determining unit 5*e*.

Furthermore, the high-risk zone determining unit 2 can convert the degree of risk associated with each of the plural pieces of information acquired by the sensor unit 1-B into a score to determine the degree of risk according to the score associated with each of the plural pieces of information or the sum total of the scores associated with the plural pieces of information.

For example, a score showing the degree of risk is added in such a way that the score increases as the distance between an obstacle and the vehicle which is acquired by each sensor becomes short.

In the above-mentioned explanation, although the case in which the warning sound emitting device 5 includes the output gain value determining unit 5*e* is shown, in a case of a structure of not having the output gain value determining unit 5*e*, as shown in FIG. 9, the process of changing the output sound volume of the warning sound (step ST2-2) is omitted.

Next, the high-risk zone determining unit 2 determines the degree of risk with reference to the predetermined criteria read from the storage unit 2-A on the basis of the distance information showing the distance between each detected obstacle and the type of this obstacle (a pedestrian, a light vehicle, a motorbike, another vehicle, or the like), which are acquired from the sensor unit 1-B, and then determines whether or not the zone through which the vehicle is running is a high-risk zone on the basis of the information showing the degree of risk (step ST2-3). When determining that the running zone is a high-risk zone (step ST2-3; YES), the high-risk zone determining unit 2 outputs the determination result showing that the running zone is a high-risk zone to the warning sound off control prohibiting unit 3, whereas when determining that the running zone is not a high-risk zone (step ST2-3; NO), the high-risk zone determining unit outputs the determination result showing that the running zone is not a high-risk zone to the warning sound off control prohibiting unit 3.

After that, the processes in steps ST2-4 to ST2-11 are the same as those in steps ST1-4 to ST1-11 explained with reference to FIG. 11 in above-mentioned Embodiment 1. Furthermore, when the key switch of the vehicle is turned off while the sound-directed-outside-vehicle emitting device in accordance with Embodiment 2 is performing the process of FIG. 19, a shutdown interrupt shown in FIG. 12 explained in above-mentioned Embodiment 1 occurs. In addition, an interrupt process of FIG. 13 in a case in which only an operation of performing the off control of the emission of the warning sound using the switch 4 can be carried out, and an interrupt process of FIG. 14 in a case in which both an operation of performing the off control of the emission of the warning sound using the switch 4 and an operation of performing the on control of the emission of the warning sound using the switch 4 can be carried out can also be applied to the structure in accordance with Embodiment 2.

As mentioned above, the sound-directed-outside-vehicle emitting device in accordance with this Embodiment 2 includes the storage unit 2-A for storing the criteria by each of which to determine whether or not the running zone is a high-risk zone, a status of the vehicle being described in each of the criteria, and the sensor unit 1-B which is the information acquiring unit for acquiring the information showing a status of the vehicle, and compares the presence or absence of an obstacle in the surrounding area of the vehicle, such as a pedestrian, a motorbike, a light vehicle, or another vehicle, and the distance information about the distance between the obstacle and the vehicle which are acquired by the sensor unit 1-B, with the criteria read from the storage unit 2-A to determine whether or not the vehicle is running through a high-risk zone, and, even if an operation of commanding a stop of the output of the warning sound is performed on the switch 4 by something outside the sound-directed-outside-vehicle emitting device, does not stop the output of the warning sound when it is determined that the vehicle is running through a high-risk zone.

Because the sound-directed-outside-vehicle emitting device is constructed in this way, the sound-directed-outside-vehicle emitting device can prohibit the output of the warning sound from being stopped arbitrarily by the user as long as it is determined from the status of the vehicle that the vehicle is running through a high-risk zone. As a result, the sound-directed-outside-vehicle emitting device can emit the warning sound certainly in the running zone in which the running of the vehicle should be noticed, and therefore can improve the safety in the running zone.

Furthermore, as the sensor unit 1-B, sensors, such as corner sensors already mounted in the vehicle, can be used.

Embodiment 3

FIG. 20 is a block diagram showing the whole configuration of a system to which a sound-directed-outside-vehicle emitting device in accordance with Embodiment 3 of the present invention is applied. As shown in FIG. 20, the sound-directed-outside-vehicle emitting device in accordance with Embodiment 3 is provided with a camera unit 1-C instead of the navigation device 1-A in the structure of FIG. 2 explained in above-mentioned Embodiment 1. The same structural components as those shown in FIGS. 1 and 2 or like structural components are designated by the same reference numerals as those shown in the figures, and the explanation of the components will be omitted hereafter.

The camera unit 1-C is provided with a unit mounted inside or outside the vehicle, such as a rear camera, a drive recorder, or an infrared camera, for capturing and recording a video image. The number of cameras which construct the camera unit 1-C can be one or more. The information acquired by the camera unit 1-C is sent to a high-risk zone determining unit 2.

Furthermore, the camera unit 1-C includes an information processing unit for performing image analysis of video data about a captured video image of a scene outside the vehicle to acquire the presence or absence of an obstacle in an area surrounding the vehicle, such as a pedestrian, a light vehicle, a motorbike or another vehicle, the distance information about the distance between the obstacle and the vehicle, traffic sign information, running road information, information about the weather, and information about the time zone.

The running road information is information showing the road width, the road type, such as a local street or a highway, the speed limit, intersections, curves, etc., and is determined from the road form, traffic signs, etc. which have been captured.

Furthermore, the weather and the time zone are determined by specifying the appearance of the sky and a change of the amount of sunshine in captured video images of scenes outside the vehicle through the image analysis of the captured video images.

The time at which the camera unit 1-C sends the pieces of information to the high-risk zone determining unit 2 is not necessarily determined by monitoring the camera unit 1-C at all times by the high-risk zone determining unit 2. For example, at fixed time intervals or every time when the vehicle runs a fixed distance, the high-risk zone determining unit 2 can acquire the pieces of information from the camera unit 1-C. This time length of each time interval and the fixed distance can be changed dynamically according to at least one of an environmental variation in the inside of the vehicle and an environmental variation in the outside of the vehicle. As this environmental variation, a change of the time zone, the vehicle speed, the weather, facilities in the vicinity of the running zone, or the like can be taken. For example, when the vehicle is running in a time zone in which it is light outside the vehicle, the number of times that the pieces of information are acquired can be increased by shortening the time length of each time interval and the fixed running distance, whereas when the vehicle is running in a time zone, such as a midnight time zone, in which it is dark outside the vehicle, the number of times that the pieces of information are acquired can be decreased by lengthening the time length of each time interval and the fixed running distance. Furthermore, a mechanism, such as a switch, for making it possible to set the time length of each time interval and the fixed running distance can be disposed to allow the user to change them according to the user's operation. Thus, by dynamically changing the time at which the high-risk zone determining unit acquires the pieces of information, the high-risk zone determining unit can carry out the process with a high degree of efficiency.

In a case of emitting a warning sound only at the time when the vehicle is running at a low speed, the high-risk zone determining unit 2 collects only speed limit information from the camera unit 1-C at all times, and, when the vehicle is running at a speed falling within a predetermined limited low speed range because the vehicle is in a school zone or the like, the high-risk zone determining unit acquires information other than the speed limit information among pieces of information which are used for the above-mentioned high-risk zone determination, whereas when the vehicle is running at a speed not falling within the above-mentioned limited speed range (when the vehicle is running at a speed below a limited high speed range for a highway or the like), the high-risk zone determining unit does not acquire any information other than the vehicle speed information. Furthermore, the information which the high-risk zone determining unit collects at all times can be anything other than the limited speed information as long as the high-risk zone determining unit can grasp the running speed of the vehicle from the information.

By using the above-mentioned pieces of information acquired from the camera unit 1-C, the high-risk zone determining unit 2 checks to see the degree of risk of the zone in which the vehicle is running, and determines whether or not the running zone must be a high-risk zone in which there is a high risk of accidents if the user turns off the warning sound arbitrarily. When determining that the running zone must be a high-risk zone, the high-risk zone determining unit 2 informs a warning sound off control prohibiting unit 3 that the running zone is a high-risk zone.

FIG. 21 is a view showing an example (Example 1) of a determining table stored in a storage unit 2-A in accordance with Embodiment 3, and shows the determining table in which criteria by each of which to determine that the running zone of the vehicle is a high-risk zone are summarized, together with examples of the determination result obtained by the high-risk zone determining unit 2.

The high-risk zone determining unit 2 determines whether or not the running zone is a high-risk zone by determining whether each of the criteria described in the determining table shown in FIG. 21 is met for the running zone of the vehicle according to the above-mentioned pieces of information acquired from the camera unit 1-C. The example of FIG. 21 shows a case in which the high-risk zone determining unit determines whether or not each of the criteria is met in order of increasing numeral identifying each criterion, and determines that the running zone of the vehicle meets "Is there any obstacle in the surrounding area of the vehicle?" which is criterion 1.

Thus, when one of the criteria described in the determining table is met, the high-risk zone determining unit determines that the running zone of the vehicle is a high-risk zone.

FIG. 22 is a view showing a further example (Example 2) of the determining table stored in the storage unit 2-A in accordance with Embodiment 3, and shows the determining table in which the criteria by each of which to determine that the running zone of the vehicle is a high-risk zone are summarized, a score (a degree of risk) showing the degree of risk corresponding to the contents of each criterion being added to the criterion, together with examples of the determination result obtained by the high-risk zone determining unit 2. For example, the largest degree of risk is set to 10 and the smallest degree of risk is set to 1, and degrees of risk between them are set to levels 2 to 9, like in the case of Embodiment 1.

The high-risk zone determining unit 2 determines whether or not each of the criteria is met in order of increasing numeral identifying each of the criteria, and, when the degree of risk associated with the criterion which the running zone of the vehicle meets is equal to or larger than a predetermined threshold, determines that the running zone is a high-risk zone, or otherwise determines that the running zone is not a high-risk zone.

Furthermore, in a case in which the running zone of the vehicle meets two or more criteria, if the sum total of the degrees of risk associated with these criteria is equal to or larger than the predetermined threshold, the high-risk zone determining unit determines that the running zone is a high-risk zone, or otherwise determines that the running zone is not a high-risk zone.

In the example of FIG. 22, the threshold regarding degrees of risk is set to "8", and the running zone of the vehicle meets the contents of criterion 3: "Is the road width narrow?", and the contents of criterion 4: "Is the vehicle running through an intersection?". In this case, because "9" which is the sum total of the degree of risk of "5" corresponding the contents of criterion 3, and the degree of risk of "4" corresponding the contents of criterion 4 is equal to or larger than the threshold of "8", it is determined that the running zone is a "high-risk zone".

FIG. 23 is a view showing another example (Example 3) of the determining table stored in the storage unit 2-A in accordance with Embodiment 3, and shows the determining table in which the criteria by each of which to determine that the running zone of the vehicle is a high-risk zone are summarized, additional criteria about the distance between an obstacle and the vehicle and the road width being added to each criterion, and a degree of risk corresponding to each criterion being added to the criterion, together with examples of the determination result obtained by the high-risk zone determining unit 2.

In the determining table shown in FIG. 22, although the degree of risk of "5" is added to the contents of the criterion: "Is the road width narrow?" with respect to a fixed road width (e.g., 10 m), such the degree of risk is excessive when the vehicle is running along a road having a width smaller than the above-mentioned fixed road width, but the road width provides a sufficient spacing between pedestrians walking on a road side and the vehicle.

Therefore, as shown in FIG. 23, "5 m to 10 m" which provides sufficient spacing between pedestrians walking on a road side and the vehicle is added, as an additional criterion, to the contents of the criterion: "Is the road width narrow?", and, in this case in which these criteria are met, the degree of risk is set to "3", and "less than 5 m" which provides an expectation that the vehicle is running with a short spacing between pedestrians walking on a road side and the vehicle is also added, as an additional criterion, to the contents of the above-mentioned criterion, and, in this case in which these criteria are met, the degree of risk is set to "6".

In the example of FIG. 23, the threshold regarding degrees of risk is set to "8", and the running zone of the vehicle meets the contents of criterion 1: "Is there any obstacle in the surrounding area of the vehicle?" and its additional criterion: "Within an area having a radius of 3 m to 5 m", and also meets the contents of criterion 3: "Is the road width narrow?" and its additional criterion: "5 m to 10 m". In this case, because "8" which is the sum total of the degree of risk of "5" corresponding the contents of criterion 1 and its additional criterion, and the degree of risk of "3" corresponding the contents of criterion 3 and its additional criterion is equal to or larger than the threshold of "8", it is determined that the running zone is a "high-risk zone".

Furthermore, as the criteria by each of which to determine whether or not the running zone of the vehicle is a high-risk zone, the following examples can be provided.

First, when the distance between an obstacle detected by the camera unit 1-C and the vehicle is short (the obstacle falls within an area having a radius of a predetermined distance around the camera of the camera unit 1-C which has detected the obstacle), when two or more obstacles exist, or when the distance between an obstacle and the vehicle becomes short with time, it can be determined that the running zone of the vehicle is a high-risk zone.

When the road width of the running road of the vehicle specified by the running road information is narrow, when the vehicle is running through an intersection or a curve, or when the vehicle will make a right or left turn, it can be determined that the running zone of the vehicle is a high-risk zone.

When the vehicle is running along a highway, it can be determined that the vehicle is not running through a high-risk zone, and, when the vehicle is running in a service area, it can be determined that the vehicle is running through a high-risk zone.

Because there is a high possibility that the vehicle is running through a zone with many pedestrians, such as a residential street, when the running road of the vehicle has a low speed limit, it can be determined that the vehicle is running through a high-risk zone as long as the speed limit is equal to or smaller than an arbitrary threshold.

Because there is a high risk of children running into the road, many pedestrians walking in the surrounding area of the vehicle, and so on when it is determined from the traffic sign information that a facility, such as an elementary school or a shopping center, exists in the surrounding area of the vehicle, it can be determined that the vehicle is running through a high-risk zone.

In a case of using the current time information, it can be determined that the vehicle is running through a high-risk zone when the current time zone is the one which is determined to have a risk of accidents if running in a warning sound stop state. For example, because the running sound made by the vehicle running can become difficult to be heard in a time zone in which the surrounding noise becomes large, it is determined that the vehicle is running through a high-risk zone.

Furthermore, because the driver's angle of visibility becomes narrow in a time zone in which the surroundings become dark, it can be determined that the vehicle is running through a high-risk zone. In this case, because people around the vehicle visually and easily notice the vehicle running if the vehicle stays lit up, it can be determined that the vehicle is not running through a high-risk zone as long as the vehicle stays lit up.

Furthermore, the high-risk zone determining unit can determine whether or not the zone through which the vehicle is running is a high-risk zone on the basis of a combination of the surrounding facility information and the current time information. For example, because even if a shopping center exists in the surrounding area of the vehicle, the pedestrian flow decreases after stores have been closed, the high-risk zone determining unit can determine that the running zone is a high-risk zone from a combination with the current time information when the stores are open for business, whereas the high-risk zone determining unit can determine that the running zone is not a high-risk zone after their closing times.

The weather information can be used for the determination. For example, when it is raining, the running sound made by the vehicle running can become further difficult to be heard. Therefore, when detecting that it is raining or when detecting a certain amount of rainfall equal to or larger than an arbitrary threshold, the high-risk zone determining unit can determine that the vehicle is running through a high-risk zone.

In addition, when a criterion by which to determine that the vehicle is running from a safe zone to a high-risk zone is the same as that by which to determine that the vehicle is running from the high-risk zone to the safe area, there is a possibility that the determination result may change unnecessarily and frequently while the vehicle is running through the boundary between the high-risk zone and the safe zone. To solve this problem, when updating the determination from a high-risk zone to a safe zone, instead of determining that the vehicle is running through a high-risk zone from only one-time determination result, the high-risk zone determining unit can update the determination from a safe zone to a high-risk zone when continuously determining that the vehicle is running through a high-risk zone multiple times.

Furthermore, as previously explained with reference to FIG. 7 in above-mentioned Embodiment 1, a difference can be provided between a threshold set for degrees of risk which are used for determination of whether or not the vehicle is running through a safe zone, and a threshold set for degrees of risk which are used for determination of whether or not the vehicle is running through a high-risk zone.

Furthermore, in Embodiment 3, the warning sound off control prohibiting unit 3 has the same structure as that of FIG. 8 shown in above-mentioned Embodiment 1. Each of a switch 4, a speaker for outside of vehicle 6, an in-vehicle speaker 7, and a display unit 8 has the same structure and function as those explained in above-mentioned Embodiment 1, too. In addition, a warning sound emitting device 5 has the same structure as that of FIG. 9 or 10 shown in above-mentioned Embodiment 1.

In the subsequent explanation, the structure of the sound-directed-outside-vehicle emitting device in accordance with Embodiment 3 will be explained with reference to FIGS. 8 to 10 in addition to FIG. 20.

Next, the operation of the sound-directed-outside-vehicle emitting device will be explained.

Figure 24:
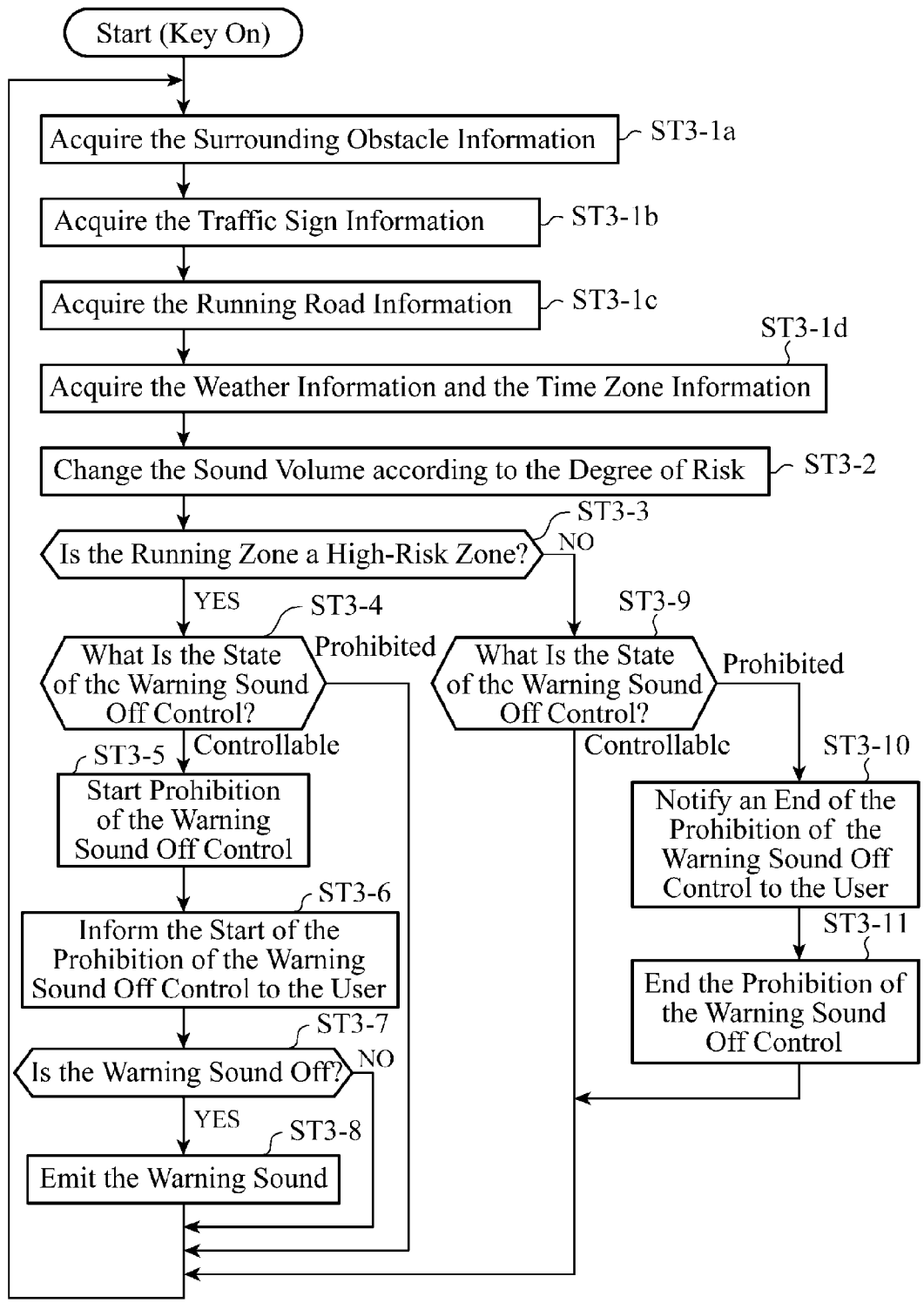
FIG. 24 is a flowchart showing a flow of the operation performed by the sound-directed-outside-vehicle emitting device in accordance with Embodiment 3.

FIG. 24 is a flow chart showing a flow of the operation performed by the sound-directed-outside-vehicle emitting device in accordance with Embodiment 3, and shows the details of warning sound emission processing including determination of whether to carry out the off control of the warning sound according to the degree of risk of the running zone of the vehicle.

First, when the key switch of the vehicle is turned on, the camera unit 1-C acquires the obstacle information about obstacles existing in the surrounding area of the vehicle (step ST3-1a), and also acquires the traffic sign information (step ST3-1b).

The camera unit 1-C acquires the running road information and at least one of the weather information and the time zone information (steps ST3-1c and ST3-1d). These pieces of information are outputted from the camera unit 1-C to the high-risk zone determining unit 2.

The high-risk zone determining unit 2 checks to see the degree of risk of the road zone along which the vehicle is running on the basis of the pieces of information which are inputted from the camera unit 1-C, and the predetermined criteria which are read from the storage unit 2-A, and informs the degree of risk of the road zone to an output gain value determining unit 5e.

The output gain value determining unit 5e determines the gain value at which the device outputs the warning sound according to the degree of risk inputted from the high-risk zone determining unit 2, and sets the gain value to a speaker output processing unit 5d. As a result, the speaker output processing unit 5d changes the output sound volume of the warning sound according to the output gain value set thereto by the output gain value determining unit 5e (step ST3-2).

For example, when the degree of risk inputted from the high-risk zone determining unit 2 is larger than a predetermined threshold, the output gain value determining unit 5e increases the gain value, or otherwise decreases the gain value.

The high-risk zone determining unit 2 can inform the degree of risk to the output gain value determining unit 5e according to the number of times that one of the criteria by which to determine whether or not the running zone is a high-risk zone is met, the criteria being held by the storage unit 2-A.

For example, when the number of times that one of the criteria by which to determine whether or not the running zone is a high-risk zone is met becomes equal to or larger than a predetermined threshold, the high-risk zone determining unit informs the degree of risk to the output gain value determining unit 5e.

The high-risk zone determining unit 2 can also convert the degree of risk associated with each of the plural pieces of information acquired by the camera unit 1-C into a score to determine the degree of risk according to the score associated with each of the plural pieces of information or the sum total of the scores associated with the plural pieces of information.

For example, a score showing the degree of risk is added in such a way that the score increases as the distance between an obstacle and the vehicle which is acquired by each sensor becomes short.

In the above-mentioned explanation, although the case in which the warning sound emitting device 5 includes the output gain value determining unit 5e is shown, in a case of a structure of not having the output gain value determining unit 5e, as shown in FIG. 9, the process of changing the output sound volume of the warning sound (step ST3-2) is omitted.

Next, the high-risk zone determining unit 2 determines the degree of risk with reference to the predetermined criteria read from the storage unit 2-A on the basis of the pieces of information which are acquired by the camera unit 1-C, and then determines whether or not the zone through which the vehicle is running is a high-risk zone on the basis of the information showing the degree of risk (step ST3-3).

When determining that the running zone is a high-risk zone (step ST3-3; YES), the high-risk zone determining unit 2 outputs the determination result showing that the running zone is a high-risk zone to the warning sound off control prohibiting unit 3, whereas when determining that the running zone is not a high-risk zone (step ST3-3; NO), the high-risk zone determining unit outputs the determination result showing that the running zone is not a high-risk zone to the warning sound off control prohibiting unit 3.

After that, the processes in steps ST3-4 to ST3-11 are the same as those in steps ST1-4 to ST1-11 explained with reference to FIG. 11 in above-mentioned Embodiment 1. Furthermore, when the key switch of the vehicle is turned off while the sound-directed-outside-vehicle emitting device in accordance with Embodiment 3 is performing the process of FIG. 24, a shutdown interrupt shown in FIG. 12 explained in above-mentioned Embodiment 1 occurs. In addition, an interrupt process of FIG. 13 in the case in which only an operation of performing the off control of the emission of the warning sound using the switch 4 can be carried out, and an interrupt process of FIG. 14 in the case in which both an operation of performing the off control of the emission of the warning sound using the switch 4 and an operation of performing the on control of the emission of the warning sound using the switch 4 can be carried out can also be applied to the structure in accordance with Embodiment 3.

As mentioned above, the sound-directed-outside-vehicle emitting device in accordance with this Embodiment 3 includes the storage unit 2-A for storing the criteria by each of which to determine whether or not the running zone is high-risk zone, a status of the vehicle being described in each of the criteria, and the camera unit 1-C which is the information acquiring unit for acquiring the information showing a status of the vehicle, and compares the presence or absence of an obstacle, the distance information about the distance between the obstacle and the vehicle, the traffic sign information, the running road information, and real time information, such as the weather information or the time zone information, which are acquired by the camera unit 1-C, with the criteria read from the storage unit 2-A to determine whether or not the vehicle is running through a high-risk zone, and, even if an operation of commanding a stop of the output of the warning sound is performed on the switch 4 by something outside the sound-directed-outside-vehicle emitting device, does not stop the output of the warning sound when it is determined that the vehicle is running through a high-risk zone.

Because the sound-directed-outside-vehicle emitting device is constructed in this way, the sound-directed-outside-vehicle emitting device can prohibit the output of the warning sound from being stopped arbitrarily by the user as long as it is determined from the status of the vehicle that the vehicle is running through a high-risk zone. As a result, the sound-directed-outside-vehicle emitting device can emit the warning sound certainly in the running zone in which the running of the vehicle should be noticed, and therefore can improve the safety in the running zone.

As the camera unit 1-C, a camera already mounted in the vehicle, such as a drive recorder or a rear camera, can be used.

Embodiment 4

FIG. 25 is a block diagram showing the whole configuration of a system to which a sound-directed-outside-vehicle emitting device in accordance with Embodiment 4 of the present invention is applied. As shown in FIG. 25, the sound-directed-outside-vehicle emitting device in accordance with Embodiment 4 is provided with a vehicle-mounted device 1-D instead of the navigation device 1-A in the structure of FIG. 2 explained in above-mentioned Embodiment 1. The same structural components as those shown in FIGS. 1 and 2 or like structural components are designated by the same reference numerals as those shown in the figures, and the explanation of the components will be omitted hereafter.

The vehicle-mounted device 1-D is equipment mounted in the vehicle, and including a speed sensor for detecting a vehicle speed signal, equipment for acquiring a back signal showing that the vehicle has shifted to a reverse gear, and an operation signal showing that a light switch, a winker switch, or a wiper switch is operated, and a road-to-vehicle communication device, such as an ETC (Electronic Toll Collection) (a registered trademark; this description will be omitted hereafter) unit or a light beacon unit. Pieces of information acquired by the vehicle-mounted device 1-D are sent to a high-risk zone determining unit 2.

The time at which the vehicle-mounted device 1-D sends the pieces of information to the high-risk zone determining unit 2 is not necessarily determined by monitoring the vehicle-mounted device 1-D at all times by the high-risk zone determining unit 2. For example, at fixed time intervals or every time when the vehicle runs a fixed distance, the high-risk zone determining unit 2 can acquire the pieces of information from the vehicle-mounted device 1-D. This time length of each time interval and the fixed running distance can be changed dynamically according to at least one of an environmental variation in the inside of the vehicle and an environmental variation in the outside of the vehicle. As this environmental variation, a change of the time zone, the vehicle speed, the weather, or the like can be taken. For example, when the vehicle is running at a speed lower than a certain speed, the number of times that the pieces of information are acquired can be increased by shortening the time length of each time interval and the fixed running distance, whereas when the vehicle is running at a speed equal to higher than the certain speed, the number of times that the pieces of information are acquired can be decreased by lengthening the time length of each time interval and the fixed running distance. Furthermore, a mechanism, such as a switch, for making it possible to set the time length of each time interval and the fixed running distance can be disposed to allow the user to change them according to the user's operation. Thus, by dynamically changing the time at which the high-risk zone determining unit acquires the pieces of information, the high-risk zone determining unit can carry out the process with a high degree of efficiency.

In a case of emitting a warning sound only when the vehicle is running at a low speed, the high-risk zone determining unit 2 can always collect only the vehicle speed signal from the vehicle-mounted device 1-D, and, when the vehicle speed falls within a predetermined low vehicle speed range, acquire information other than the vehicle speed signal, among the information used for the above-mentioned high-risk zone determination, whereas when the vehicle speed does not fall within the predetermined low vehicle speed range (e.g. when the vehicle is running at a high speed), the high-risk zone determining unit can acquire nothing other than the vehicle speed signal. Furthermore, the information which the high-risk zone determining unit collects at all times can be anything other than the vehicle speed signal as long as the high-risk zone determining unit can grasp the running speed of the vehicle from the information.

By using the above-mentioned pieces of information acquired from the vehicle-mounted device 1-D, the high-risk zone determining unit 2 checks to see the degree of risk of the zone in which the vehicle is running, and determines whether or not the running zone must be a high-risk zone in which there is a high risk of accidents if the user turns off the warning sound arbitrarily. When determining that the running zone must be a high-risk zone, the high-risk zone determining unit 2 informs a warning sound off control prohibiting unit 3 that the running zone is a high-risk zone.

FIG. 26 is a view showing an example (Example 1) of a determining table stored in a storage unit 2-A in accordance with Embodiment 4, and shows the determining table in which criteria by each of which to determine that the running zone of the vehicle is a high-risk zone are summarized, together with examples of the determination result obtained by the high-risk zone determining unit 2.

The high-risk zone determining unit 2 determines whether or not the running zone is a high-risk zone by determining whether each of the criteria described in the determining table shown in FIG. 26 is met for the running zone of the vehicle according to the vehicle speed information, whether the lights stay lit, whether or not a winker is operating, whether or not the wiper is operating, information showing whether or not the vehicle is running in reverse, and so on which are acquired from the vehicle-mounted device 1-D. The example of FIG. 26 shows a case in which the high-risk zone determining unit determines whether or not each of the criteria is met in order of increasing numeral identifying each criterion, and determines that the running zone of the vehicle meets the contents of criterion 1: "Is the vehicle is running at a low speed (equal to or lower than an arbitrary threshold)?".

Thus, when one of the criteria described in the determining table is met, the high-risk zone determining unit determines that the running zone of the vehicle is a high-risk zone.

FIG. 27 is a view showing another example (Example 2) of the determining table stored in the storage unit 2-A in accordance with Embodiment 4, and shows the determining table in which the criteria by each of which to determine that the running zone of the vehicle is a high-risk zone are summarized, a score (a degree of risk) showing the degree of risk corresponding to the contents of each criterion being added to the criterion, together with examples of the determination result obtained by the high-risk zone determining unit 2. For example, the largest degree of risk is set to 10 and the smallest degree of risk is set to 1, and degrees of risk between them are set to levels 2 to 9, like in the case of Embodiment 1.

The high-risk zone determining unit 2 determines whether or not each of the criteria is met in order of increasing numeral identifying each of the criteria, and, when the degree of risk associated with the criterion which the running zone of the vehicle meets is equal to or larger than a predetermined threshold, determines that the running zone is a high-risk zone, or otherwise determines that the running zone is not a high-risk zone.

Furthermore, in a case in which the running zone of the vehicle meets two or more criteria, if the sum total of the degrees of risk associated with these criteria is equal to or larger than the predetermined threshold, the high-risk zone determining unit determines that the running zone is a high-risk zone, or otherwise determines that the running zone is not a high-risk zone.

In the example of FIG. 27, the threshold regarding degrees of risk is set to "8", and the running zone of the vehicle meets the contents of criterion 2: "Do the lights stay lit?", and the contents of criterion 3: "Is a winker operating?". In this case, because "8" which is the sum total of the degree of risk of "4" corresponding the contents of criterion 2, and the degree of risk of "4" corresponding the contents of criterion 3 is equal to or larger than the threshold of "8", it is determined that the running zone is a "high-risk zone".

FIG. 28 is a view showing another example (Example 3) of the determining table stored in the storage unit 2-A in accordance with Embodiment 4, and shows the determining table in which the criteria by each of which to determine that the running zone of the vehicle is a high-risk zone are summarized, an additional criterion about the vehicle speed and a degree of risk corresponding to each criterion being added to the criterion, together with examples of the determination result obtained by the high-risk zone determining unit 2.

In the determining table shown in FIG. 27, although the degree of risk of "8" is added to the contents of the criterion: "Is the vehicle running at a low speed?" with respect to an arbitrary threshold (e.g., 30 km), such the degree of risk is excessive when the vehicle is running at some high speed at which it can be expected that the frequency with which the device needs to alert pedestrians to the presence of the vehicle is low even if the vehicle is running at a speed equal to or lower than the above-mentioned threshold.

Therefore, as shown in FIG. 28, "Speed of 20 km to 30 km" which provides an expectation that the frequency with which the device needs to alert pedestrians to the presence of the vehicle is low is added, as an additional criterion, to the contents of the criterion: "Is the vehicle running at a low speed?", and, in this case in which these criteria are met, the degree of risk is set to "4", and "Speed of less than 20 km" which provides an expectation that the frequency with which the device needs to alert pedestrians to the presence of the vehicle is high is also added, as an additional criterion, to the contents of the above-mentioned criterion, and, in this case in which these criteria are met, the degree of risk is set to "9".

In the example of FIG. 28, the threshold regarding degrees of risk is set to "8", and the running zone of the vehicle meets the contents of criterion 1: "Is the vehicle running at a low speed?" and its additional criterion: "Speed of 20 km to 30 km", and also meets the contents of criterion 4: "Is the wiper operating?". In this case, because "8" which is the sum total of the degree of risk of "4" corresponding the contents of criterion 1 and its additional criterion, and the degree of risk of "4" corresponding the contents of criterion 4 is equal to or larger than the threshold of "8", it is determined that the running zone is a "high-risk zone".

Furthermore, as the criteria by each of which to determine whether or not the running zone of the vehicle is a high-risk zone, the following examples can be provided.

An electric vehicle produces very small noise at the time of low speed running, and therefore cannot be easily noticed by anything in the surrounding area of the vehicle.

Therefore, by using the running speed information acquired from the vehicle speed signal, the high-risk zone determining unit determines that the vehicle is running through a high-risk zone when the running speed is smaller than an arbitrary threshold.

In contrast with this, because when the vehicle is running at a high speed, the degree of risk increases according to the vehicle speed at the time, the high-risk zone determining unit can determine that the vehicle is running through a high-risk zone when the running speed is equal to or higher than an arbitrary threshold.

When the vehicle is running backward, the driver's visual field becomes narrower compared with the time when the vehicle is running forward, and it is very dangerous for the driver to drive the vehicle in this situation.

Therefore, the high-risk zone determining unit can determine that the vehicle is running through a high-risk zone when determining from the back signal that the vehicle is running backward.

Information showing whether the lights stay lit is acquired from a light operation signal.

Because anything in an area surrounding the vehicle notices the presence of the vehicle easily and visually when the lights stay lit, the high-risk zone determining unit can determine that the vehicle is not running through a high-risk zone.

In contrast with this, because the surrounding area of the vehicle is dark and it is therefore difficult for the driver to notice obstacles in the surrounding area when the lights stay lit, the high-risk zone determining unit can determine that the vehicle is running through a high-risk zone.

Information showing whether or not the vehicle is making a left or right turn is acquired from a winker operation signal.

There exist many blind spots when the vehicle is making a left or right turn, and it is therefore very dangerous for the vehicle to run in a state in where no warning sound is emitted.

Therefore, when noticing that the vehicle is making a left or right turn from the winker operation signal, the high-risk zone determining unit can determine that the vehicle is running through a high-risk zone.

Furthermore, information showing a lane change is also acquired from the winker operation signal.

Because there is a necessity to get the presence of the vehicle noticed by other surrounding vehicles when the vehicle is making a lane change, the high-risk zone determining unit can determine that the vehicle is running through a high-risk zone.

Information showing whether or not it is raining outside the vehicle is acquired from an wiper operation signal.

When it is raining, there is a possibility that it becomes harder to hear the running sound because of the rain.

Therefore, when the wiper is operating, the high-risk zone determining unit can determine that the vehicle is running through a high-risk zone.

Furthermore, the high-risk zone determining unit can determine whether or not the vehicle is running through a high-risk zone according to the speed of the wiper.

The type of the road along which the vehicle is running, such as a highway or a local street, is acquired from road-to-vehicle communication equipment including an ETC unit and a light beacon unit.

In this case, because there are no pedestrians when the vehicle is running along a highway, the high-risk zone determining unit can determine that the vehicle is not running through a high-risk zone.

However, because there are pedestrians when the vehicle is running in a service area, the high-risk zone determining unit can determine that the vehicle is running through a high-risk zone.

When a criterion by which to determine that the vehicle is running from a safe zone to a high-risk zone is the same as that by which to determine that the vehicle is running from the high-risk zone to the safe area, there is a possibility that the determination result may change unnecessarily and frequently while the vehicle is running through the boundary between the high-risk zone and the safe zone. To solve this problem, when updating the determination from a high-risk zone to a safe zone, instead of determining that the vehicle is running through a high-risk zone from only one-time determination result, the high-risk zone determining unit can update the determination from a safe zone to a high-risk zone when continuously determining that the vehicle is running through a high-risk zone multiple times.

Furthermore, as previously explained with reference to FIG. 7 in above-mentioned Embodiment 1, a difference can be provided between a threshold set for degrees of risk which are used for determination of whether or not the vehicle is running through a safe zone, and a threshold set for degrees of risk which are used for determination of whether or not the vehicle is running through a high-risk zone.

Furthermore, in Embodiment 4, the warning sound off control prohibiting unit 3 has the same structure as that of FIG. 8 shown in above-mentioned Embodiment 1. Each of a switch 4, a speaker for outside of vehicle 6, an in-vehicle speaker 7, and a display unit 8 has the same structure and function as those explained in above-mentioned Embodiment 1, too. In addition, a warning sound emitting device 5 has the same structure as that of FIG. 9 or 10 shown in above-mentioned Embodiment 1.

In the subsequent explanation, the structure of the sound-directed-outside-vehicle emitting device in accordance with Embodiment 4 will be explained with reference to FIGS. 8 to 10 in addition to FIG. 25.

Next, the operation of the sound-directed-outside-vehicle emitting device will be explained.

Figure 29:
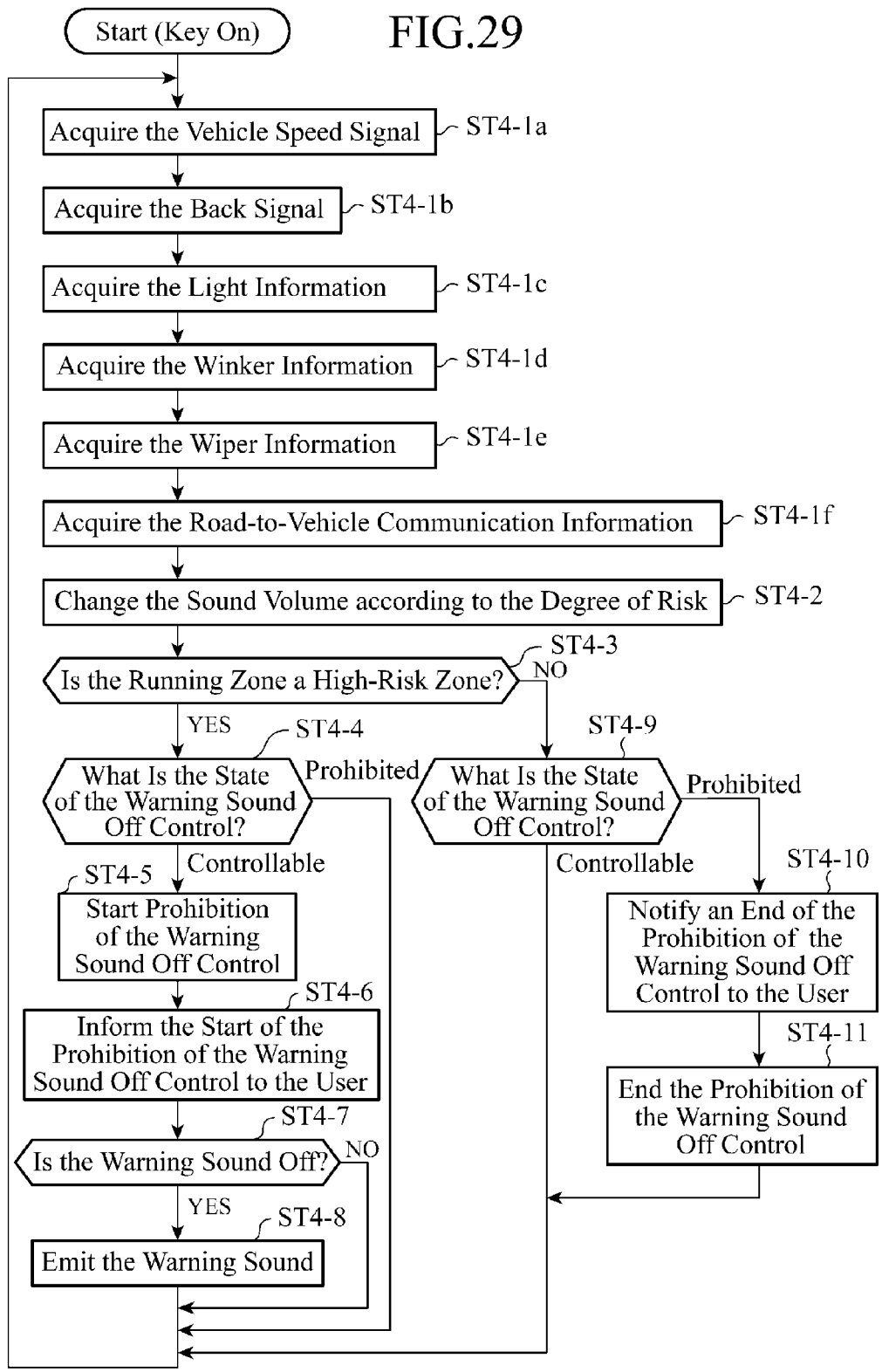
FIG. 29 is a flowchart showing a flow of the operation performed by the sound-directed-outside-vehicle emitting device in accordance with Embodiment 4.

FIG. 29 is a flow chart showing a flow of the operation performed by the sound-directed-outside-vehicle emitting device in accordance with Embodiment 4, and shows the details of warning sound emission processing including determination of whether to carry out the off control of the warning sound according to the degree of risk of the running zone of the vehicle.

First, when the key switch of the vehicle is turned on, the vehicle-mounted device 1-D acquires the vehicle speed signal (step ST4-1a), and acquires the back signal (step ST4-1b).

The vehicle-mounted device 1-D also acquires the light information, the winker information, the wiper information, and the road-to-vehicle communication information (steps ST4-1c, ST4-1d, ST4-1e and ST4-1f). These pieces of information are outputted from the vehicle-mounted device 1-D to the high-risk zone determining unit 2.

The high-risk zone determining unit 2 checks to see the degree of risk of the road zone along which the vehicle is running on the basis of the pieces of information which are inputted from the vehicle-mounted device 1-D, and the predetermined criteria which are read from the storage unit 2-A, and informs the degree of risk of the road zone to an output gain value determining unit 5e.

The output gain value determining unit 5e determines the gain value at which the device outputs the warning sound according to the degree of risk inputted from the high-risk zone determining unit 2, and sets the gain value to a speaker output processing unit 5d. As a result, the speaker output processing unit 5d changes the output sound volume of the warning sound according to the output gain value set thereto by the output gain value determining unit 5e (step ST4-2).

For example, when the degree of risk inputted from the high-risk zone determining unit 2 is larger than a predetermined threshold, the output gain value determining unit 5e increases the gain value, or otherwise decreases the gain value.

The high-risk zone determining unit 2 can inform the degree of risk to the output gain value determining unit 5e according to the number of times that one of the criteria by each of which to determine whether or not the running zone is a high-risk zone is met, the criteria being held by the storage unit 2-A.

For example, when the number of times that one of the criteria by which to determine whether or not the running zone is a high-risk zone is met becomes equal to or larger than a predetermined threshold, the high-risk zone determining unit informs the degree of risk to the output gain value determining unit 5e.

Furthermore, the high-risk zone determining unit 2 can convert the degree of risk associated with each of the plural pieces of information acquired by the vehicle-mounted device 1-D into a score to determine the degree of risk according to the score associated with each of the plural pieces of information or the sum total of the scores associated with the plural pieces of information.

For example, a score showing the degree of risk is added in such a way that the score increases as the distance between an obstacle and the vehicle which is acquired by each sensor becomes short.

In the above-mentioned explanation, although the casein which the warning sound emitting device 5 includes the output gain value determining unit 5e is shown, in a case of a structure of not having the output gain value determining unit 5e, as shown in FIG. 9, the process of changing the output sound volume of the warning sound (step ST4-2) is omitted.

Next, the high-risk zone determining unit 2 determines the degree of risk with reference to the predetermined criteria read from the storage unit 2-A on the basis of the pieces of information which are acquired by the vehicle-mounted device 1-D, and then determines whether the zone through which the vehicle is running is a high-risk zone on the basis of the information showing the degree of risk (step ST4-3).

When determining that the running zone is a high-risk zone (step ST4-3; YES), the high-risk zone determining unit 2 outputs the determination result showing that the running zone is a high-risk zone to the warning sound off control prohibiting unit 3, whereas when determining that the running zone is not a high-risk zone (step ST4-3; NO), the high-risk zone determining unit outputs the determination result showing that the running zone is not a high-risk zone to the warning sound off control prohibiting unit 3.

After that, the processes in steps ST4-4 to ST4-11 are the same as those in steps ST1-4 to ST1-11 explained with reference to FIG. 11 in above-mentioned Embodiment 1. Furthermore, when the key switch of the vehicle is turned off while the sound-directed-outside-vehicle emitting device in accordance with Embodiment 4 is performing the process of FIG. 29, a shutdown interrupt shown in FIG. 12 explained in above-mentioned Embodiment 1 occurs. In addition, an interrupt process of FIG. 13 in the case in which only an operation of performing the off control of the emission of the warning sound using the switch 4 can be carried out, and an interrupt process of FIG. 14 in the case in which both an operation of performing the off control of the emission of the warning sound using the switch 4 and an operation of performing the ON control of the emission of the warning sound using the switch 4 can be carried out can also be applied to the structure in accordance with Embodiment 4.

As mentioned above, the sound-directed-outside-vehicle emitting device in accordance with this Embodiment 4 includes the storage unit 2-A for storing the criteria by each of which to determine whether or not the running zone is high-risk zone, a status of the vehicle being described in each of the criteria, and the vehicle-mounted device 1-D which is the information acquiring unit for acquiring the information showing a status of the vehicle, and compares the pieces of information acquired by the vehicle-mounted device 1-D with the criteria read from the storage unit 2-A to determine whether or not the vehicle is running through a high-risk zone, and, even if an operation of commanding a stop of the output of the warning sound is performed on the switch 4 by something outside the sound-directed-outside-vehicle emitting device, does not stop the output of the warning sound when it is determined that the vehicle is running through a high-risk zone.

Because the sound-directed-outside-vehicle emitting device is constructed in this way, the sound-directed-outside-vehicle emitting device can prohibit the output of the warning sound from being stopped arbitrarily by the user as long as it is determined from the status of the vehicle that the vehicle is running through a high-risk zone. As a result, the sound-directed-outside-vehicle emitting device can emit the warning sound certainly in the running zone in which the running of the vehicle should be noticed, and therefore can improve the safety in the running zone.

Furthermore, as the vehicle-mounted unit 1-D, a speed sensor already mounted in the vehicle, for detecting the vehicle speed signal, equipment for acquiring the back signal showing that the vehicle has shifted to a reverse gear, and an operation signal showing that the light switch, the winker switch, or the wiper switch is operated, and a road-to-vehicle communication device can be used.

Embodiment 5

Figure 30:
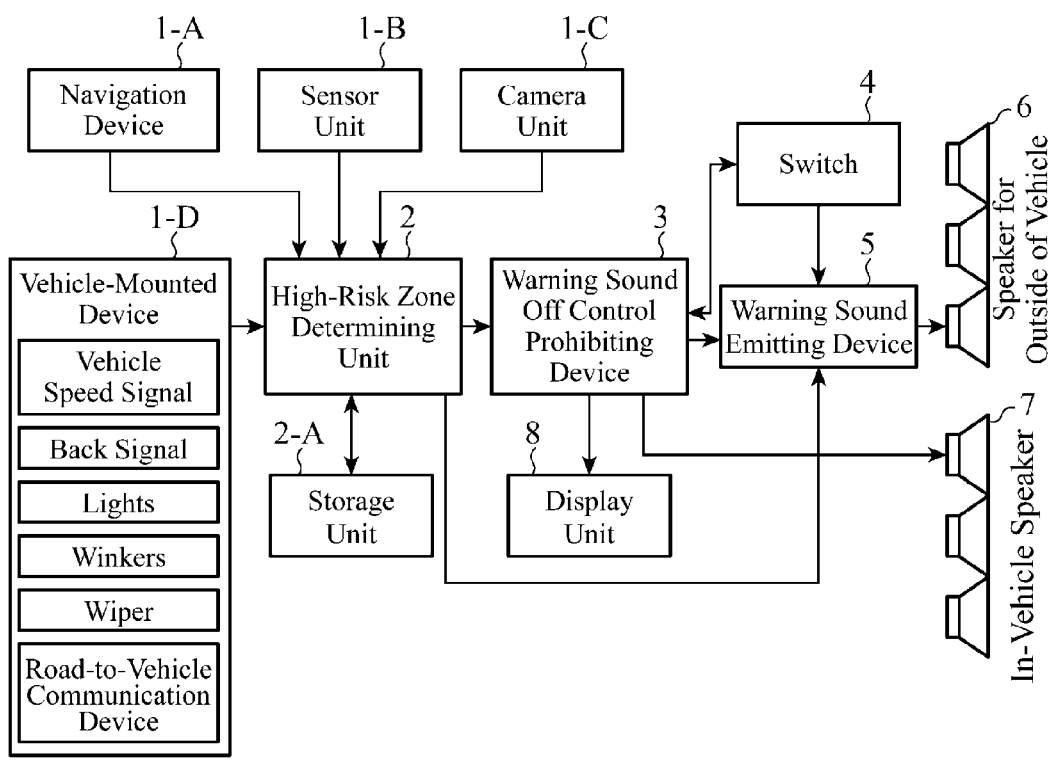
FIG. 30 is a block diagram showing the whole configuration of a system to which a sound-directed-outside-vehicle emitting device in accordance with Embodiment 5 is applied.

FIG. 30 is a block diagram showing the whole configuration of a system to which a sound-directed-outside-vehicle emitting device in accordance with Embodiment 5 of the present invention is applied. As shown in FIG. 30, the sound-directed-outside-vehicle emitting device in accordance with Embodiment 5 is provided with, as a high-risk zone determination information acquisition device, a navigation device 1-A explained in above-mentioned Embodiment 1, a sensor unit 1-B explained in above-mentioned Embodiment 2, a camera unit 1-C explained in above-mentioned Embodiment 3, and a vehicle-mounted device 1-D explained in above-mentioned Embodiment 4. The same structural components as those shown in FIGS. 1 and 2 or like structural components are designated by the same reference numerals as those shown in the figures, and the explanation of the components will be omitted hereafter.

The above-mentioned high-risk zone determination information acquisition device in accordance with Embodiment 5 operates in the same way that those in accordance with above-mentioned Embodiments 1 to 4 do to acquire current time information, current position information, running road information (including a road width, a road type, such as a local street or a highway, a speed limit, intersections, and curves), accident danger zone information, surrounding facility information, the presence or absence of obstacles in an area surrounding the vehicle, distance information about the distance between each obstacle and the vehicle, etc., and sends these pieces of information to a high-risk zone determining unit 2.

The time at which the above-mentioned high-risk zone determination information acquisition device sends the pieces of information to the high-risk zone determining unit 2 is not necessarily determined by monitoring the above-mentioned high-risk zone determination information acquisition device at all times by the high-risk zone determining unit 2. For example, at fixed time intervals or every time when the vehicle runs a fixed distance, the high-risk zone determining unit 2 can acquire the pieces of information from the above-mentioned high-risk zone determination information acquisition device. This time length of each time interval and the fixed running distance can be changed dynamically according to at least one of an environmental variation in the inside of the vehicle and an environmental variation in the outside of the vehicle. As this environmental variation, a change of the time zone, the vehicle speed, the weather, the surrounding facilities in the running zone, or the like can be taken. For example, in a time zone from 8:00 to 20:00, the number of times that the pieces of information are acquired can be increased by shortening the fixed duration and the fixed running distance, and in a time zone from 20:00 to 8:00, the number of times that the pieces of information are acquired can be decreased by lengthening the fixed duration and the fixed running distance. Furthermore, a mechanism, such as a switch, for making it possible to set the time length of each time interval and the fixed running distance can be disposed to allow the user to change them according to the user's operation. Thus, by dynamically changing the time at which the high-risk zone determining unit acquires the pieces of information, the high-risk zone determining unit can carry out the process with a high degree of efficiency.

In a case of emitting a warning sound only when the vehicle is running at a low speed, the high-risk zone determining unit 2 can always collect only the vehicle speed information from the above-mentioned high-risk zone determination information acquisition device, and, when the vehicle speed falls within a predetermined low vehicle speed range, acquire information other than the vehicle speed information, among the information used for the above-mentioned high-risk zone determination, whereas when the vehicle speed does not fall within the predetermined low vehicle speed range (e.g. when the vehicle is running at a high speed), the high-risk zone determining unit can acquire nothing other than the vehicle speed information. Furthermore, the information which the high-risk zone determining unit collects at all times can be anything other than the speed information as long as the high-risk zone determining unit can grasp the running speed of the vehicle from the information.

By using the pieces of information acquired from the high-risk zone determination information acquisition device in accordance with Embodiment 5, the high-risk zone determining unit 2 checks to see the degree of risk of the zone in which the vehicle is running, and determines whether or not the running zone must be a high-risk zone in which there is a high risk of accidents if the user turns off the warning sound arbitrarily. When determining that the running zone must be a high-risk zone, the high-risk zone determining unit 2 informs a warning sound off control prohibiting unit 3 that the running zone is a high-risk zone.

FIG. 31 is a view showing an example (Example 1) of a determining table stored in a storage unit 2-A in accordance with Embodiment 5, and shows the determining table in which criteria by each of which to determine that the running zone of the vehicle is a high-risk zone are summarized, together with examples of the determination result obtained by the high-risk zone determining unit 2.

The high-risk zone determining unit 2 determines whether or not the running zone is a high-risk zone by determining whether each of the criteria described in the determining table shown in FIG. 31 is met for the running zone of the vehicle according to the pieces of information acquired from the high-risk zone determination information acquisition device in accordance with Embodiment 5.

The example of FIG. 31 shows a case in which the high-risk zone determining unit determines whether or not each of the criteria is met in order of increasing numeral identifying each criterion, and determines that the running zone of the vehicle meets the contents of criterion 11: "Is there any pedestrian in the surrounding area of the vehicle?" from the information acquired by the sensor unit 1-B, and also determines that the running zone of the vehicle meets the contents of criterion 12: "Is there any obstacle in the surrounding area of the vehicle?" from the information acquired by the camera unit 1-C. That is, a pedestrian detected by the sensor unit 1-B is detected, as an obstacle, by the camera unit 1-C.

Thus, when one of the criteria described in the determining table is met, the high-risk zone determining unit determines that the running zone of the vehicle is a high-risk zone.

FIG. 32 is a view showing another example (Example 2) of the determining table stored in the storage unit 2-A in accordance with Embodiment 5, and shows the determining table in which the criteria by each of which to determine that the running zone of the vehicle is a high-risk zone are summarized, a criterion about the running time of the vehicle being added to each of some of them, together with examples of the determination result obtained by the high-risk zone determining unit 2.

The high-risk zone determining unit 2 determines whether or not the running zone is a high-risk zone by determining whether each of the criteria with an additional criterion described in the determining table shown in FIG. 32 is met for the running zone of the vehicle according to the above-mentioned pieces of information acquired from the high-risk zone determination information acquisition device in accordance with Embodiment 5.

The example of FIG. 32 shows a case in which the high-risk zone determining unit determines whether or not each of the criteria is met in order of increasing numeral identifying each criterion, and determines that the running zone of the vehicle meets the contents of criterion 02: "Is there any elementary school in the surrounding area of the vehicle?" from the information acquired by the navigation device 1-A and that the running zone of the vehicle meets its additional criterion: "During school commute times", and also determines that the running zone of the vehicle meets the contents of criterion 22: "Is the vehicle running through a school zone?" from the information acquired by the camera unit 1-C and that the running zone of the vehicle meets its additional criterion: "During school commute times". Thus, when one of the criteria with an additional criterion described in the determining table is met, the high-risk zone determining unit determines that the running zone of the vehicle is a high-risk zone.

FIG. 33 is a view showing a further example (Example 3) of the determining table stored in the storage unit 2-A in accordance with Embodiment 5, and shows the determining table in which the criteria by each of which to determine that the running zone of the vehicle is a high-risk zone are summarized, a score (a degree of risk) showing the degree of risk corresponding to the contents of each criterion being added to the criterion, together with examples of the determination result obtained by the high-risk zone determining unit 2. For example, the largest degree of risk is set to 10 and the smallest degree of risk is set to 1, and degrees of risk between them are set to levels 2 to 9, like in the case of Embodiment 1.

The high-risk zone determining unit 2 determines whether or not each of the criteria is met in order of increasing numeral identifying each of the criteria, and, when the degree of risk associated with the criterion which the running zone of the vehicle meets is equal to or larger than a predetermined threshold, determines that the running zone is a high-risk zone, or otherwise determines that the running zone is not a high-risk zone.

Furthermore, in a case in which the running zone of the vehicle meets two or more criteria, if the sum total of the degrees of risk associated with these criteria is equal to or larger than the predetermined threshold, the high-risk zone determining unit determines that the running zone is a high-risk zone, or otherwise determines that the running zone is not a high-risk zone.

In the example of FIG. 33, the threshold regarding degrees of risk is set to "8", and it is determined from the information acquired by the navigation device 1-A that the running zone of the vehicle meets the contents of criterion 05: "Is the speed limit 20 km/h or less?", and it is also determined from the information acquired by the vehicle-mounted device 1-D that the running zone of the vehicle meets the contents of criterion 31: "Is the vehicle running at a low speed?". In this case, because "11" which is the sum total of the degree of risk of "3" corresponding the contents of criterion 05 and the degree of risk of "8" corresponding the contents of criterion 31 is equal to or larger than the threshold of "8", it is determined that the running zone is a "high-risk zone".

FIG. 34 is a view showing another example (Example 3) of the determining table stored in the storage unit 2-A in accordance with Embodiment 5, and shows the determining table in which the criteria by each of which to determine that the running zone of the vehicle is a high-risk zone are summarized, one or more additional criteria about the running time zone, the distance between an obstacle and the vehicle, the road width, or the vehicle speed being added to each of some of the criteria and a degree of risk corresponding to each criterion being added to the criterion, together with examples of the determination result obtained by the high-risk zone determining unit 2.

In the determining table shown in FIG. 33, although the degree of risk of "8" is added to the contents of the criterion: "Is the vehicle running at a low speed?" with respect to an arbitrary threshold (e.g., 30 km), such the degree of risk is excessive when the vehicle is running at some high speed at which it can be expected that the frequency with which the device needs to alert pedestrians to the presence of the vehicle is low even if the vehicle is running at a speed equal to or lower than the above-mentioned threshold.

Therefore, as shown in FIG. 34, "Speed of 20 km to 30 km" which provides an expectation that the frequency with which the device needs to alert pedestrians to the presence of the vehicle is low is added, as an additional criterion, to the contents of the criterion: "Is the vehicle running at a low speed?", and, in this case in which these criteria are met, the degree of risk is set to "4", and "Speed of less than 20 km" which provides an expectation that the frequency with which the device needs to alert pedestrians to the presence of the vehicle is high is also added, as an additional criterion, to the contents of the above-mentioned criterion, and, in this case in which these criteria are met, the degree of risk is set to "9".

In the example of FIG. 34, the threshold regarding degrees of risk is set to "8", and the running zone of the vehicle meets the contents of criterion 2: "Is there any elementary school in the surrounding area of the vehicle?" and the contents of its additional criterion: "Except during school commute times", also meets the contents of criterion 22: "Is the vehicle running through a school zone?" and the contents of its additional criterion: "Except during school commute times", and further meets the contents of criterion 31: "Is the vehicle running at a low speed?" and the contents of its additional criterion: "Speed of 20 km to 30 km". In this case, because "10" which is the sum total of the degree of risk of "3" corresponding the contents of criterion 2 and the contents of its additional criterion, the degree of risk of "3" corresponding the contents of criterion 22 and the contents of its additional criterion, and the degree of risk of "4" corresponding the contents of criterion 31 and the contents of its additional criterion is equal to or larger than the threshold of "8", it is determined that the running zone is a "high-risk zone".

When a criterion by which to determine that the vehicle is running from a safe zone to a high-risk zone is the same as that by which to determine that the vehicle is running from the high-risk zone to the safe area, there is a possibility that the determination result may change unnecessarily and frequently while the vehicle is running through the boundary between the high-risk zone and the safe zone. To solve this problem, when updating the determination from a high-risk zone to a safe zone, instead of determining that the vehicle is running through a high-risk zone from only one-time determination result, the high-risk zone determining unit can update the determination from a safe zone to a high-risk zone when continuously determining that the vehicle is running through a high-risk zone multiple times.

Furthermore, as previously explained with reference to FIG. 7 in above-mentioned Embodiment 1, a difference can be provided between a threshold set for degrees of risk which are used for determination of whether or not the vehicle is running through a safe zone, and a threshold set for degrees of risk which are used for determination of whether or not the vehicle is running through a high-risk zone.

Furthermore, in Embodiment 5, the warning sound off control prohibiting unit 3 has the same structure as that of FIG. 8 shown in above-mentioned Embodiment 1. Each of a switch 4, a speaker for outside of vehicle 6, an in-vehicle speaker 7, and a display unit 8 has the same structure and function as those explained in above-mentioned Embodiment 1, too. In addition, a warning sound emitting device 5 has the same structure as that of FIG. 9 or 10 shown in above-mentioned Embodiment 1.

In the subsequent explanation, the structure of the sound-directed-outside-vehicle emitting device in accordance with Embodiment 5 will be explained with reference to FIGS. 8 to 10 in addition to FIG. 30.

Next, the operation of the sound-directed-outside-vehicle emitting device will be explained.

Figure 35:
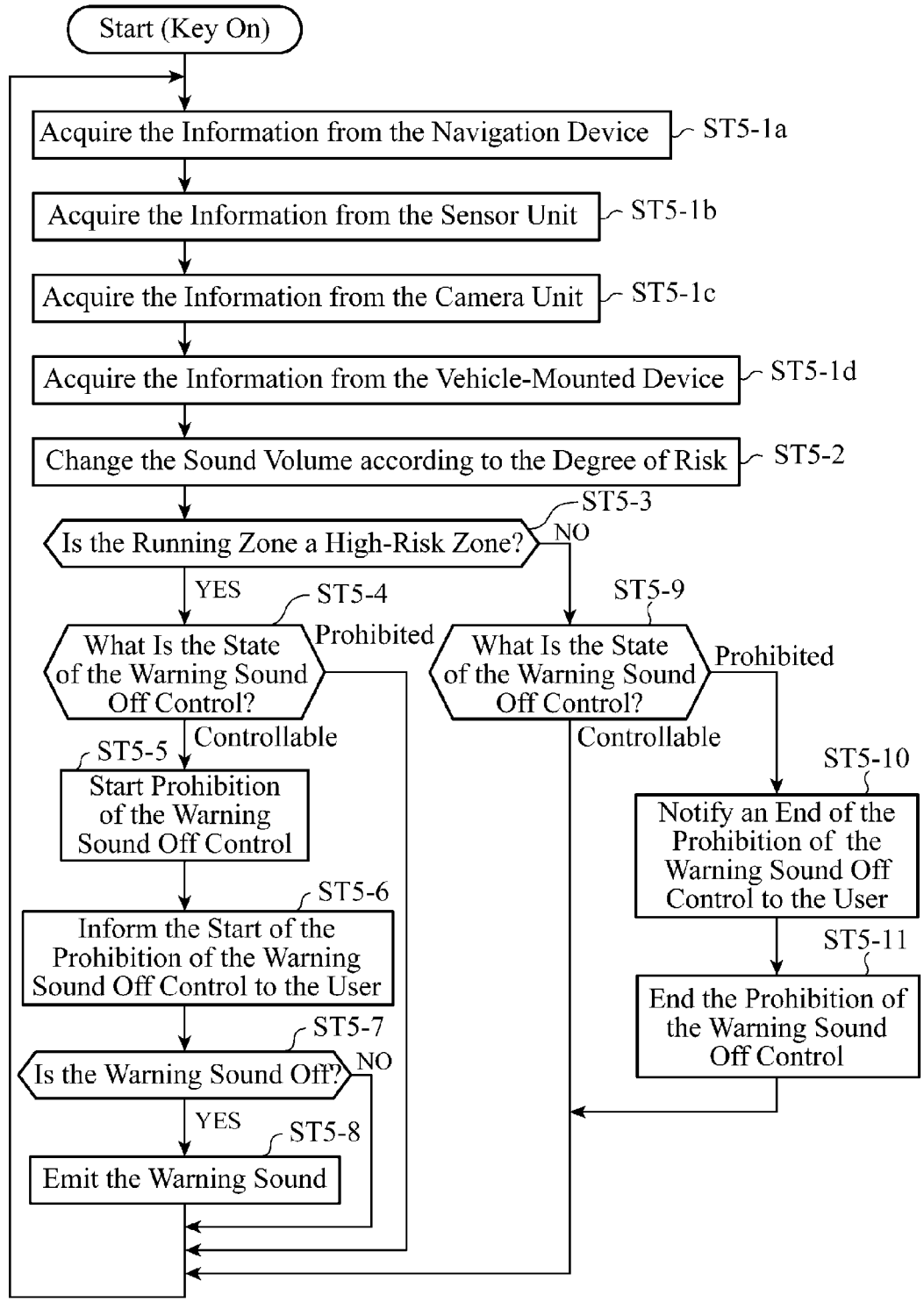
FIG. 35 is a flowchart showing a flow of the operation performed by the sound-directed-outside-vehicle emitting device in accordance with Embodiment 5.

FIG. 35 is a flow chart showing a flow of the operation performed by the sound-directed-outside-vehicle emitting device in accordance with Embodiment 5, and shows the details of warning sound emission processing including determination of whether to carry out the off control of the warning sound according to the degree of risk of the running zone of the vehicle.

First, when the key switch of the vehicle is turned on, the navigation device 1-A acquires the current time information from a GPS receiver, also acquires the current position information, and further acquires information about the running road, information about accident danger zones and information about surrounding facilities (step ST5-1a).

Furthermore, the sensor unit 1-B detects obstacles in the surrounding area of the vehicle, such as a pedestrian, a light vehicle, a motorbike, and another vehicle, and acquires information showing the type of each detected obstacle and distance information showing the distance between each detected obstacle and the vehicle (step ST5-1b).

The camera unit 1-C acquires obstacle information about obstacles existing in the surrounding area of the vehicle, also acquires traffic sign information, and further acquires information about the running road and at least one of weather information and time zone information (step ST5-1c).

The vehicle-mounted unit 1-D acquires a vehicle speed signal, also acquires aback signal, and further acquires light information, winker information, wiper information, and road-to-vehicle communication information (step ST5-1d).

These pieces of information are outputted from the navigation device 1-A, the sensor unit 1-B, the camera unit 1-C, and the vehicle-mounted unit 1-D to the high-risk zone determining unit 2 as high-risk zone determination information from the high-risk zone determination information acquisition device in accordance with Embodiment 5.

The high-risk zone determining unit 2 checks to see the degree of risk of the road zone along which the vehicle is running on the basis of the pieces of information which are inputted from the high-risk zone determination information acquisition device, and the predetermined criteria which are read from the storage unit 2-A, and informs the degree of risk of the road zone to an output gain value determining unit 5e.

The output gain value determining unit 5e determines the gain value at which the sound-directed-outside-vehicle emitting device outputs the warning sound according to the degree of risk inputted from the high-risk zone determining unit 2, and sets the gain value to a speaker output processing unit 5*d*. As a result, the speaker output processing unit 5*d* changes the output sound volume of the warning sound according to the output gain value set thereto by the output gain value determining unit 5*e* (step ST5-2).

For example, when the degree of risk inputted from the high-risk zone determining unit 2 is larger than a predetermined threshold, the output gain value determining unit 5*e* increases the gain value, or otherwise decreases the gain value.

The high-risk zone determining unit 2 can inform the degree of risk to the output gain value determining unit 5*e* according to the number of times that one of the criteria by each of which to determine whether or not the running zone is a high-risk zone is met, the criteria being held by the storage unit 2-A.

For example, when the number of times that one of the criteria by each of which to determine whether or not the running zone is a high-risk zone is met becomes equal to or larger than a predetermined threshold, the high-risk zone determining unit informs the degree of risk to the output gain value determining unit 5*e*.

Furthermore, the high-risk zone determining unit 2 can convert the degree of risk associated with each of the plural pieces of information acquired by the high-risk zone determination information acquisition device into a score to determine the degree of risk according to the score associated with each of the plural pieces of information or the sum total of the scores associated with the plural pieces of information.

For example, a score showing the degree of risk is added in such a way that the score increases as the distance between an obstacle and the vehicle which is acquired by each sensor becomes short.

In the above-mentioned explanation, although the case where the warning sound emitting device 5 includes the output gain value determining unit 5*e* is shown, in a case of a structure of not having the output gain value determining unit 5*e*, as shown in FIG. 9, the process of changing the output sound volume of the warning sound (step ST5-2) is omitted.

Next, the high-risk zone determining unit 2 determines the degree of risk with reference to the predetermined criteria read from the storage unit 2-A on the basis of the pieces of information which are acquired by the high-risk zone determination information acquisition device in accordance with Embodiment 5, and then determines whether or not the zone through which the vehicle is running is a high-risk zone on the basis of the information showing the degree of risk (step ST5-3).

When determining that the running zone is a high-risk zone (step ST5-3; YES), the high-risk zone determining unit 2 outputs the determination result showing that the running zone is a high-risk zone to the warning sound off control prohibiting unit 3, whereas when determining that the running zone is not a high-risk zone (step ST5-3; NO), the high-risk zone determining unit outputs the determination result showing that the running zone is not a high-risk zone to the warning sound off control prohibiting unit 3.

After that, the processes in steps ST5-4 to ST5-11 are the same as those in steps ST1-4 to ST1-11 explained with reference to FIG. 11 in above-mentioned Embodiment 1. Furthermore, when the key switch of the vehicle is turned off while the sound-directed-outside-vehicle emitting device in accordance with Embodiment 5 is performing the process of FIG. 35, a shutdown interrupt shown in FIG. 12 explained in above-mentioned Embodiment 1 occurs. In addition, an interrupt process of FIG. 13 in the case in which only an operation of performing the off control of the emission of the warning sound using the switch 4 can be carried out, and an interrupt process of FIG. 14 in the case in which both an operation of performing the off control of the emission of the warning sound using the switch 4 and an operation of performing the ON control of the emission of the warning sound using the switch 4 can be carried out can also be applied to the structure in accordance with Embodiment 5.

As mentioned above, the sound-directed-outside-vehicle emitting device in accordance with this Embodiment 5 includes the storage unit 2-A for storing the criteria by which to determine whether or not the running zone is high-risk zone, a status of the vehicle being described in each of the criteria, and the navigation device 1-A, the sensor unit 1-B, the camera unit 1-C, and the vehicle-mounted unit 1-D each of which is an information acquiring unit for acquiring information showing a status of the vehicles, and compares the pieces of information acquired by the navigation device 1-A, the sensor unit 1-B, the camera unit 1-C, and the vehicle-mounted unit 1-D with the criteria read from the storage unit 2-A to determine whether or not the vehicle is running through a high-risk zone, and, even if an operation of commanding a stop of the output of the warning sound is performed on the switch 4 by something outside the sound-directed-outside-vehicle emitting device, does not stop the output of the warning sound when it is determined that the vehicle is running through a high-risk zone.

Because the sound-directed-outside-vehicle emitting device is constructed in this way, the sound-directed-outside-vehicle emitting device can prohibit the output of the warning sound from being stopped arbitrarily by the user as long as it is determined from the status of the vehicle that the vehicle is running through a high-risk zone. As a result, the sound-directed-outside-vehicle emitting device can emit the warning sound certainly in the running zone in which the running of the vehicle should be noticed, and therefore can improve the safety in the running zone.

Industrial Applicability

Because the sound-directed-outside-vehicle emitting device in accordance with the present invention can control whether to enable or disable a stop of the emission of the warning sound by the user according to whether or not the vehicle is running through a high-risk zone, the sound-directed-outside-vehicle emitting device in accordance with the present invention is suitable for use as an emitting device mounted in an electric vehicle having a small amount of running sound or the like, for emitting a pseudo running sound.

The invention claimed is:

1. A sound-directed-outside-vehicle emitting device mounted in a vehicle, for emitting a sound directed outside the vehicle, said sound-directed-outside-vehicle emitting device comprising:

a sound emitting unit for emitting a sound directed outside the vehicle;

a storage unit for storing criteria by each of which to determine whether or not a running zone is a high-risk zone, each of said criteria describing a status of the vehicle;

an information acquiring unit for acquiring information showing a status of said vehicle;

a determining unit for comparing the information showing the status of said vehicle acquired by said information acquiring unit with said criteria read from said storage unit to determine whether or not said vehicle is running through a high-risk zone; and a control unit for controlling the output of said sound emitting unit while not stopping the output of said sound emitting unit when said determining unit determines that said vehicle is running through a high-risk zone even if a predetermined operation of commanding a stop of the output of the sound is performed thereon by something outside said sound-directed-outside-vehicle emitting device.

2. The sound-directed-outside-vehicle emitting device according to claim 1, wherein said information acquiring unit acquires the information showing the status of said vehicle at fixed time intervals, and said determining unit compares the information showing the status of said vehicle which is acquired by said information acquiring unit at the fixed time intervals with said criteria read from said storage unit to determine whether or not said vehicle is running through a high-risk zone.

3. The sound-directed-outside-vehicle emitting device according to claim 1, wherein said information acquiring unit acquires the information showing the status of said vehicle every time when said vehicle runs a fixed distance, and said determining unit compares the information showing the status of said vehicle which is acquired by said information acquiring unit every time when said vehicle runs the fixed distance with said criteria read from said storage unit to determine whether or not said vehicle is running through a high-risk zone.

4. The sound-directed-outside-vehicle emitting device according to claim 1, wherein said storage unit stores, as said criteria, a criterion showing whether a predetermined ground object or a predetermined obstacle exists in an area surrounding the vehicle, said information acquiring unit detects said predetermined ground object or said predetermined obstacle existing in an area surrounding said vehicle, and said determining unit compares said predetermined ground object or said predetermined obstacle detected by said information acquiring unit with said criteria read from said storage unit to determine whether or not said vehicle is running through a high-risk zone.

5. The sound-directed-outside-vehicle emitting device according to claim 1, wherein said storage unit stores, as said criteria, a criterion showing whether a predetermined ground object exists in an area surrounding the vehicle and a criterion showing a running time zone of said vehicle, said information acquiring unit detects said predetermined ground object existing in an area surrounding said vehicle and a running time zone of said vehicle, and said determining unit compares said predetermined ground object and said running time of said vehicle detected by said information acquiring unit with said criteria read from said storage unit to determine whether or not said vehicle is running through a high-risk zone.

6. The sound-directed-outside-vehicle emitting device according to claim 1, wherein said storage unit stores, as said criteria, a criterion showing whether a predetermined obstacle exists in an area surrounding the vehicle and a criterion showing a distance between said obstacle and said vehicle, said information acquiring unit detects whether the predetermined obstacle exists in an area surrounding said vehicle and a distance between said obstacle and said vehicle, and said determining unit compares said predetermined obstacle existing in an area surrounding said vehicle and the distance between said obstacle and said vehicle which are detected by said information acquiring unit with said criteria read from said storage unit to determine whether or not said vehicle is running through a high-risk zone.

7. The sound-directed-outside-vehicle emitting device according to claim 1, wherein said storage unit stores, as said criteria, a criterion showing a predetermined vehicle speed range, said information acquiring unit detects a vehicle speed of said vehicle, and said determining unit compares the vehicle speed of said vehicle detected by said information acquiring unit with said vehicle speed range of said criteria read from said storage unit to determine whether or not said vehicle is running through a high-risk zone.

8. The sound-directed-outside-vehicle emitting device according to claim 1, wherein said storage unit stores, as said criteria, a criterion showing a predetermined road width range of roads along which vehicles run, said information acquiring unit detects a road width of a road along which said vehicle is running, and said determining unit compares the road width of the road along which said vehicle is running and which is detected by said information acquiring unit with said predetermined road width range of said criteria read from said storage unit to determine whether or not said vehicle is running through a high-risk zone.

9. The sound-directed-outside-vehicle emitting device according to claim 1, wherein said information acquiring unit dynamically changes a time at which said information acquiring unit acquires the information showing the status of said vehicle according to at least one of an environmental variation in an inside of the vehicle and an environmental variation in an outside of the vehicle.

10. The sound-directed-outside-vehicle emitting device according to claim 1, wherein said sound-directed-outside-vehicle emitting device includes a presentation unit for presenting information to a user, and, when the predetermined operation of commanding the stop of the output of the sound is performed thereon by something outside said sound-directed-outside-vehicle emitting device while said determining unit determines that said vehicle is running through a high-risk zone, said control unit presents information showing that said predetermined operation is disabled or said sound emitting unit cannot stop the output by way of said presentation unit.

11. The sound-directed-outside-vehicle emitting device according to claim 10, wherein said control unit presents a reason why the predetermined operation of commanding the stop of the output of the sound must not be performed while said determining unit determines that said vehicle is running through a high-risk zone by way of said presentation unit.

12. The sound-directed-outside-vehicle emitting device according to claim 1, wherein said storage unit stores a degree of risk for a high-risk zone as said criteria, and said control unit changes a sound volume of the output sound of said sound emitting unit according to said degree of risk.

* * * * *